(12) United States Patent
Clifford et al.

(10) Patent No.: US 11,692,657 B2
(45) Date of Patent: Jul. 4, 2023

(54) QUICK CONNECT FLUID CONNECTOR, SWIVEL, AND COMBINATION THEREOF

(71) Applicant: FasTest, Inc., Roseville, MN (US)

(72) Inventors: Jason Clifford, Roseville, MN (US); Robert Danielson, Roseville, MN (US)

(73) Assignee: FasTest, Inc., Roseville, MN (US)

( * ) Notice: Subject to any disclaimer, the term of this patent is extended or adjusted under 35 U.S.C. 154(b) by 391 days.

(21) Appl. No.: 16/825,398

(22) Filed: Mar. 20, 2020

(65) Prior Publication Data

US 2020/0300397 A1 Sep. 24, 2020

Related U.S. Application Data

(60) Provisional application No. 62/822,327, filed on Mar. 22, 2019.

(51) Int. Cl.
*F16L 37/52* (2006.01)
*F16L 27/087* (2006.01)
*F16L 39/04* (2006.01)

(52) U.S. Cl.
CPC ............ *F16L 37/52* (2013.01); *F16L 27/087* (2013.01); *F16L 39/04* (2013.01)

(58) Field of Classification Search
CPC ....... F16L 37/53; F16L 27/08; F16L 27/0804; F16L 27/087; F16L 27/125; F16L 39/04
See application file for complete search history.

(56) References Cited

U.S. PATENT DOCUMENTS

| 2,701,146 | A | * | 2/1955 | Warren | ................... | F16L 39/04 |
| | | | | | | 285/121.5 |
| 2,805,087 | A | * | 9/1957 | Shaw | ...................... | F16L 39/04 |
| | | | | | | 285/271 |
| 3,874,706 | A | | 4/1975 | Arnold | | |
| 4,045,054 | A | | 8/1977 | Arnold | | |
| 4,485,654 | A | | 12/1984 | Rasmussen | | |
| 4,781,404 | A | | 11/1988 | Tharp et al. | | |
| 5,080,401 | A | * | 1/1992 | Stich | ..................... | F16L 27/087 |
| | | | | | | 285/190 |

(Continued)

FOREIGN PATENT DOCUMENTS

| CA | 2822554 | 2/2014 |
| DE | 3735718 | 4/1988 |

(Continued)

OTHER PUBLICATIONS

International Search Report and Written Opinion, issued in the corresponding PCT application No. PCT/IB2020/052638, dated Jul. 6, 2020, 12 pages.

(Continued)

*Primary Examiner* — Zachary T Dragicevich
(74) *Attorney, Agent, or Firm* — Hamre, Schumann, Mueller & Larson, P.C.

(57) ABSTRACT

A quick connect fluid connector is directly connected to a fluid port of a fluid manifold using a quick connect fluid connector swivel that is configured to permit rotational and/or longitudinal movement of the quick connect fluid connector relative to the fluid port. The relative axial and/or rotational movements provided by the swivel eliminates the need for a fluid hose to be used in the fluid path between the quick connect fluid connector and the fluid port.

8 Claims, 19 Drawing Sheets

(56) References Cited

U.S. PATENT DOCUMENTS

| | | | |
|---|---|---|---|
| 5,195,786 A * | 3/1993 | Guardiani | F16L 39/04 285/190 |
| 6,070,917 A * | 6/2000 | Wiebe | F16L 27/087 285/190 |
| 6,073,909 A | 6/2000 | Danielson et al. | |
| 6,085,782 A * | 7/2000 | Ott | F16L 39/04 |
| 6,186,509 B1 * | 2/2001 | Wada | F16L 39/04 |
| 8,844,979 B2 | 9/2014 | Danielson | |
| 2004/0262915 A1 | 12/2004 | Hucker et al. | |
| 2010/0043918 A1 | 2/2010 | Birtcher et al. | |
| 2011/0094608 A1 | 4/2011 | Lane, III | |
| 2012/0090713 A1 * | 4/2012 | Cooley | |
| 2015/0108751 A1 | 4/2015 | Johnson | |
| 2015/0123395 A1 * | 5/2015 | Weinmann | F16L 27/125 285/121.4 |
| 2017/0037991 A1 | 2/2017 | Danielson et al. | |

FOREIGN PATENT DOCUMENTS

| | | |
|---|---|---|
| GB | 1274224 | 5/1972 |
| GB | 1409915 | 10/1975 |
| GB | 2314392 | 12/1997 |
| JP | 2008-095852 | 4/2008 |
| KR | 20050081628 | 8/2005 |
| NL | 7213915 | 4/1973 |
| WO | 2005/078331 | 8/2005 |

OTHER PUBLICATIONS

Extended European Search Report (EESR) issued in the corresponding European patent application No. 20777634.5, dated Oct. 11, 2022, 10 pages.

First Chinese Office Action and Search Report, issued in the corresponding Chinese patent application number, dated Mar. 15, 2023, 21 pages with translation.

* cited by examiner

QUICK CONNECT FLUID CONNECTOR, SWIVEL, AND COMBINATION THEREOF

FIELD

This disclosure relates to quick connect fluid connectors that are used to, for example, connect a first fluid system with a second fluid system for transferring gases, liquids and other fluids between the first and second fluid systems.

BACKGROUND

Gas cylinders are common in a wide variety of industries. For instance, in the medical industry, gas cylinders are typically filled with oxygen, carbon dioxide and the like, for a variety of medical uses. Gas cylinders are also used in various industrial fields. The gas cylinders are provided with a standardized valve assembly generally at the top thereof to allow discharge of the gas from the cylinder during use, as well as to permit filling of the cylinder with additional gas.

To process gas into or from the gas cylinders, a quick connect fluid connector is detachably affixed to the valve assembly of the cylinder. An example of a quick connect fluid connector for processing gas into or from a gas cylinder is described in U.S. Pat. No. 6,073,909. In use of the type of quick connect fluid connector described in U.S. Pat. No. 6,073,909, the quick connect fluid connector is fluidly connected to a fluid port of a fluid manifold via a fluid hose (which is sometimes referred to in the industry as a "pig tail"). The quick connect fluid connector is then attached to the valve assembly of the gas cylinder to perform the gas processing. The repeated flexing and movements of the fluid hose can lead to wearing of the fluid hose and ultimately lead to gas leaks from the fluid hose.

SUMMARY

A technique is described herein for processing a fluid into or from a fluid container without the use of a fluid hose between the quick connect fluid connector and the fluid manifold. The quick connect fluid connector is directly connected to a fluid port of the fluid manifold using a quick connect fluid connector swivel that is configured to permit rotational and/or longitudinal movement of the quick connect fluid connector relative to the fluid port. The relative axial and/or rotational movements provided by the swivel eliminates the need for a fluid hose to be used in the fluid path between the quick connect fluid connector and the fluid port. However, in some embodiments, a fluid hose could be used between the quick connect fluid connector swivel and the fluid port.

The quick connect fluid connector swivel can have any configuration that permits the rotational and/or longitudinal movement of the quick connect fluid connector relative to the fluid port. The quick connect fluid connector swivel forms part of the flow path of the gas, liquid or other fluid between the quick connect fluid connector and the fluid manifold.

Unless otherwise explicitly indicated, the term fluid is intended to encompass gas, liquid, and mixtures of gas and liquids. The fluid container can be a gas cylinder, a container for liquid, or other container.

The quick connect fluid connector can have any configuration that is suitable for mechanically connecting to and fluidly interfacing with the fluid container. In one embodiment, the quick connect fluid connector can have a configuration like that described in U.S. Pat. No. 6,073,909, or like the MediMate™ quick connect fluid connector available from FasTest Inc. of Roseville, Minn., which are manually actuated quick connect fluid connectors. In another embodiment, the quick connect fluid connector can be configured to employ pneumatics to achieve connection with the valve assembly of the fluid container as described in further detail below.

In one embodiment, a quick connect fluid connector swivel can include a first portion that is mechanically and fluidly connectable to a first fluid system, a second portion that is mechanically and fluidly connectable to a quick connect fluid connector that is connectable to a second fluid system, a fluid passageway that fluidly connects the first portion and the second portion to permit fluid communication between the first fluid system and the second fluid system via the quick connect fluid connector, and the first portion and the second portion are rotatable relative to one another about a longitudinal axis.

In some embodiments, the first portion and the second portion may also be longitudinally displaceable relative to one another along the longitudinal axis.

The first portion may be a first housing portion, and the second portion may be a second housing portion, where the first housing portion and the second housing portion are disposed around a shaft that includes at least a portion of the fluid passageway, with the longitudinal axis extending through the shaft. The first housing portion and the second housing portion are each rotatable relative to the shaft. In another embodiment, the first portion may be a housing with a port that is mechanically and fluidly connectable to the first fluid system, and the second portion may be a shaft that is disposed within the housing, with an end of the shaft being mechanically connectable to the quick connect fluid connector, and the shaft including at least a portion of the fluid passageway.

In an embodiment, the port may be rotatable relative to the housing, for example rotatable relative to the housing about an axis that is perpendicular to the longitudinal axis.

In another embodiment, a quick connect fluid connector swivel can include a housing having a housing first end, a housing second end, and a longitudinal axis extending from the housing first end to the housing second end. A housing passageway is formed in the housing along the longitudinal axis, with the housing passageway extending through the housing first end. A fluid port is formed in the housing, with the fluid port is in fluid communication with the housing passageway. A shaft is disposed in the housing passageway and has a shaft first end, a shaft second end, and a shaft axis that is coaxial to the longitudinal axis. The shaft first end is connectable to a quick connect fluid connector, the shaft is rotatable relative to the housing about the shaft axis, and the shaft is longitudinally displaceable relative to the housing in a direction parallel to the shaft axis. A first stop is provided that limits longitudinal displacement of the shaft relative to the housing in a first longitudinal direction and a second stop is provided that limits longitudinal displacement of the shaft relative to the housing in a second longitudinal direction. In addition, the shaft includes a shaft fluid passageway formed therein along the shaft axis and extends from the shaft first end in a direction toward the shaft second end, with the shaft fluid passageway being in fluid communication with the fluid port. With this construction, when the shaft first end is connected to the quick connect fluid connector, the shaft fluid passageway is in fluid communication with a fluid passageway through the quick connect fluid connector.

In another embodiment, a combination includes the quick connect fluid connector swivel and a quick connect fluid connector connected to the shaft first end. The quick connect fluid connector includes a fluid passageway that is in fluid communication with the shaft fluid passageway so that a fluid can be processed into or from a fluid system, such as a gas cylinder, via the quick connect fluid connector and the quick connect fluid connector swivel.

In still another embodiment, a combination includes a quick connect fluid connector that is detachably mechanically connectable to a fluid system to process a fluid into or from the fluid system through the quick connect fluid connector, and a quick connect fluid connector swivel connected to the quick connect fluid connector. The quick connect fluid connector can include a connector housing with a housing fluid passageway through which the fluid can flow, and a connection mechanism that is actuatable between a connected position where the quick connect fluid connector is mechanically connected to the fluid system and permits fluid to flow into or from the fluid system through the housing fluid passageway and a disconnected position where the quick connect fluid connector is not mechanically connected to the fluid system. The quick connect fluid connector swivel can include a swivel housing, and a shaft extending from the swivel housing and connected to the quick connect fluid connector. The shaft includes a shaft fluid passageway that is in fluid communication with the housing fluid passageway. The shaft is rotatable relative to the swivel housing about the shaft axis, and the shaft is longitudinally displaceable relative to the swivel housing in a direction parallel to the shaft axis, whereby the connector housing can rotate relative to the swivel housing and the connector housing can move longitudinally relative to the swivel housing.

In yet another embodiment, a system includes a fluid manifold having a plurality of fluid ports, a plurality of quick connect fluid connector swivels where each one of the quick connect fluid connector swivels is connected to a corresponding one of the fluid ports, and a plurality of quick connect fluid connectors. Each one of the quick connect fluid connectors is connected to a corresponding one of the quick connect fluid connector swivels, and each one of the quick connect fluid connectors is detachably mechanically connectable to a fluid system to process a fluid into or from the fluid system through the quick connect fluid connector. Each one of the quick connect fluid connector swivels is configured to permit rotational and longitudinal movement of the corresponding quick connect fluid connector relative to the corresponding fluid port of the fluid manifold, and each quick connect fluid connector is fluidly connected to the fluid manifold without using a fluid hose anywhere in a fluid path between the quick connect fluid connector and the fluid port.

In another embodiment, a method of facilitating processing of a fluid into or from a fluid container, such as but not limited to a gas cylinder, includes connecting a quick connect fluid connector to a fluid port of a fluid manifold using a quick connect fluid connector swivel that is configured to permit rotational and longitudinal movement of the quick connect fluid connector relative to the fluid port and without using a fluid hose anywhere in a fluid path between the quick connect fluid connector and the fluid port. In addition, the quick connect fluid connector is connected to the fluid container, followed by processing fluid into or from the fluid container through the quick connect fluid connector and the quick connect fluid connector swivel.

DRAWINGS

DETAILED DESCRIPTION

Figure 1:
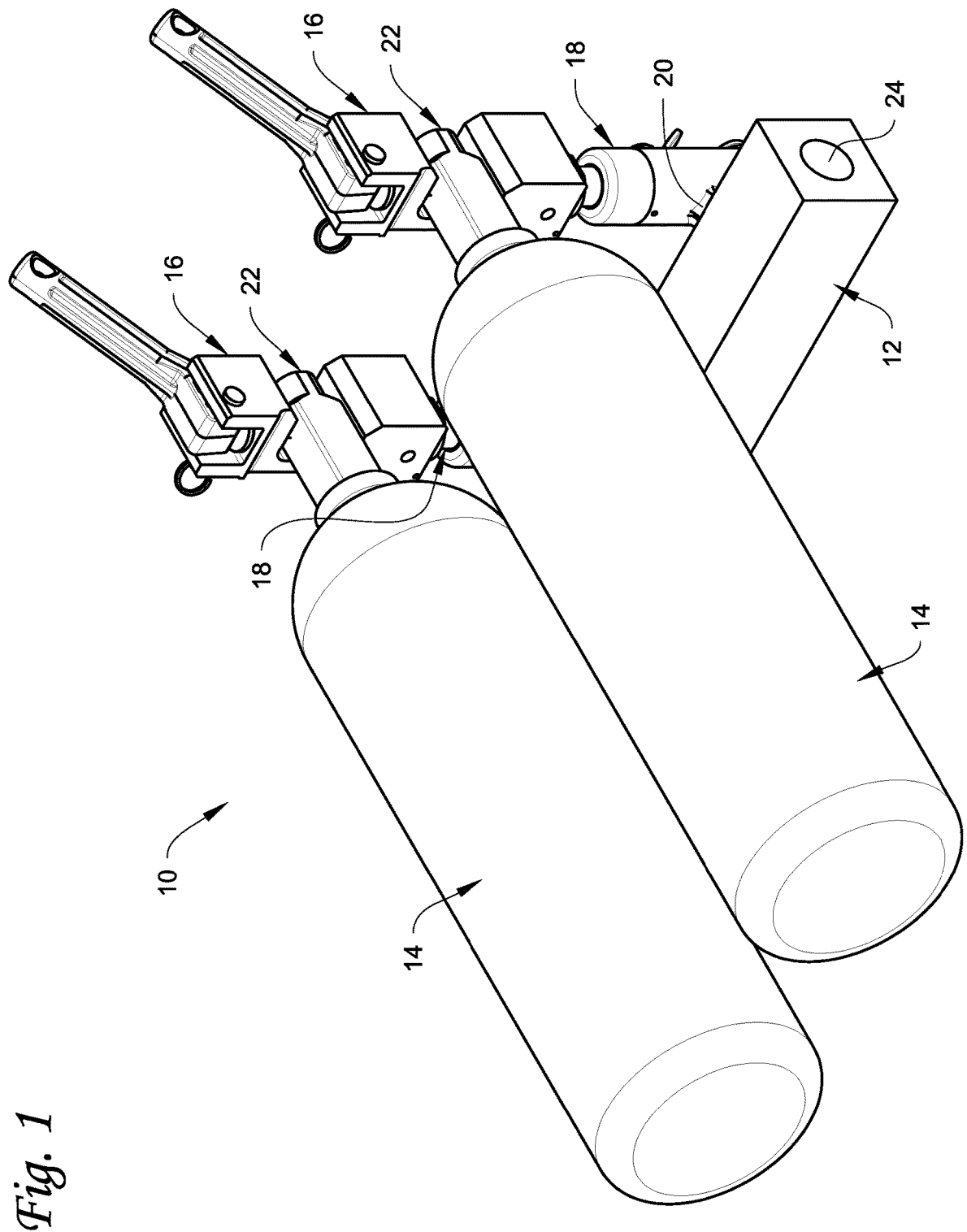
FIG. 1 illustrates a system that uses one embodiment of a quick connect fluid connector swivel and one embodiment of a quick connect fluid connector described herein.

With reference initially to FIG. 1, a fluid processing system 10 is illustrated. The system 10 is used to process a fluid, which can be a gas or a liquid or a mixture thereof, between a fluid manifold 12 forming a first fluid system (or part of a first fluid system) and one or more fluid cylinders or containers, such as gas cylinders 14, each of which forms a second fluid system. For sake of convenience in describing the concepts herein, the fluid cylinders/container will be described as being gas cylinders 14. However, the fluid cylinders/containers can contain fluids other than gas.

The illustrated system 10 includes the fluid manifold 12, a plurality of the gas cylinders 14, a plurality of quick connect fluid connectors 16, and a plurality of quick connect fluid connector swivels 18. Each one of the swivels 18 is mechanically connected to a fluid port 20 of the manifold 12. In addition, each one of the quick connect fluid connectors 16 is mechanically connected to a corresponding one of the swivels 18 as well as to a valve assembly 22 of a corresponding one of the gas cylinders 14. In use, a fluid (such as a gas) can be processed into each one of the gas cylinders 14 from the manifold 12 through the corresponding swivel 18 and the corresponding quick connect fluid connector 16. Alternatively, a fluid (such as a gas) can be processed from each one of the gas cylinders 14 and into the manifold 12 through the corresponding quick connect fluid connector 16 and the corresponding swivel 18. In some embodiments, the fluid being processed may be a liquid instead of a gas.

Still referring to FIG. 1, the fluid manifold 12 is of standard construction. The fluid manifold 12 can be used as a filling station that permits connection of a number of the gas cylinders 14 to permit simultaneous filling of the gas cylinders 14 via the fluid manifold 12, the swivels 18 and the fluid connector 16. Alternatively, the fluid manifold 12 can be used as an evacuation station to permit simultaneous evacuation of the gas cylinders 14. Or the fluid manifold 12 can be used as both a filling station and an evacuation station. The fluid manifold 12 includes a plurality of the fluid ports 20 spaced from one another along the fluid manifold 12 to provide sufficient space to permit connection of each gas cylinder 14. The fluid ports 20 are in fluid communication with a manifold fluid passage 24 which is fluidly connected to a fluid supply (not shown) that supplies gas for filling the gas cylinders 14 and/or connected to a fluid discharge to collect gas evacuated from the gas cylinders 14.

The gas cylinders 14 are also of standard construction. Each gas cylinder 14 includes the valve assembly 22 that the quick connect fluid connectors 16 are designed to mechanically and fluidly interface with, and through which gas enters or leaves the gas cylinder 14 during operation and servicing. The details of the valve assembly 22 and how it operates are well known to those having ordinary skill in the art.

The fluid connectors 16 can have any construction that renders them suitable for detachably mechanically connecting with the valve assemblies 22 of the gas cylinders 14, and for allowing fluid to flow from the gas cylinders 14 via the valve assemblies 22 and through the fluid connectors 16 during an evacuation procedure, or to flow through the fluid connectors 16 and into the gas cylinders 14 via the valve assemblies 22 during a filling procedure. In the embodiment illustrated in FIGS. 1-4, the fluid connectors 16 have a construction that is similar to the fluid connector described in U.S. Pat. No. 6,073,909, the entire contents of which are incorporated herein by reference. In another embodiment, the fluid connectors 16 can have a construction as described below with reference to FIGS. 7-9. In still another embodiment, the fluid connectors 16 can have a construction similar to the fluid connectors described in U.S. Pat. No. 8,844,979 which is incorporated herein by reference in its entirety. Many other fluid connector designs are possible as long as the fluid connector 16 can mechanically connect to the valve assembly 22, and fluid can be processed through the fluid connector.

The swivels 18 are configured to mechanically and fluidly connect to the fluid ports 20, and are configured to mechanically connect to the fluid connectors 16 in a manner to permit rotational and longitudinal movement of the fluid connectors 16 relative to the fluid port 20 of the fluid manifold 12. In one embodiment, the swivels 18 can be integrally connected to (i.e. non-detachably connected to) the fluid connectors 16 whereby at least one part of the swivel 18 also forms a part of the fluid connector 16. In another embodiment, the swivels 18 are detachably connected to the fluid connectors 16. The swivels 18 are also configured to fluidly connect the fluid connectors 16 to the fluid manifold 12. In the illustrated embodiments, the fluid connection between the fluid manifold 12 and the swivels 18 is achieved without using a fluid hose anywhere in a fluid path between the fluid connector 16 and the fluid port 20. However, in some embodiments, a fluid hose may be used. The swivels 18 can have any configuration that is suitable for achieving the functions of the swivels described herein.

Referring to FIGS. 1-4 and 13, one embodiment of the fluid connector 16 and the swivel 18 will now be described. The fluid connector 16 includes an elongated housing 30 having a bifurcated end 32, a central section 34 and a swivel connection end 36. Two spaced arms 38a, 38b define the bifurcated end 32, and an actuating lever 40 is pivotally mounted between the arms 38a, b on a pivot pin 42 extending between the arms.

A recess 44 is formed through one side of the housing 30 at the central section 34, with the recess 44 being sized so as to receive the valve assembly 22 therein. The recess 44 is oversized relative to the size of the valve assembly 22, in order to allow the valve assembly 22 to be shifted within the recess 44 in a direction parallel to a longitudinal axis of the housing 30. Angled walls 46 are preferably provided between the side of the housing 30 and the walls forming the recess 44 in order to guide the valve assembly 22 into the recess 44. Since the recess 44 is formed through the side of the housing 30, the valve assembly 22 can be fitted within the recess 44 through a simple sideways movement of the fluid connector 16, with the angled walls 46 guiding the valve assembly 22 into the recess.

Figure 3:
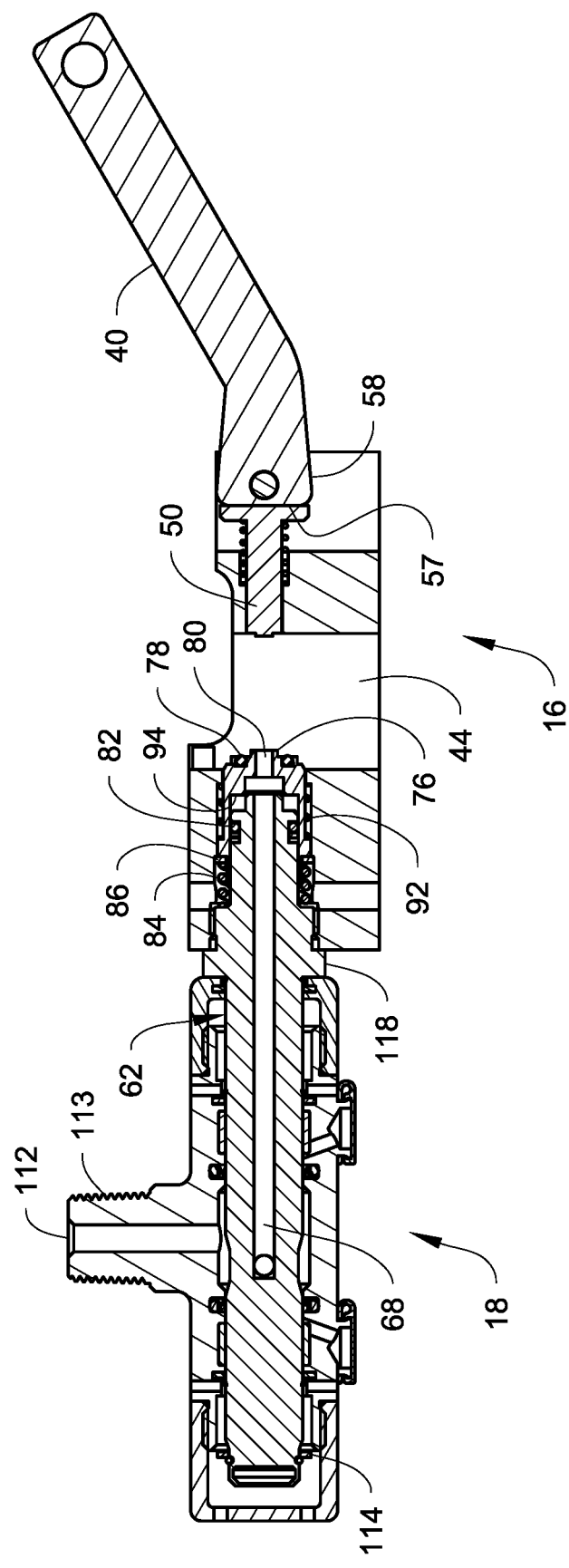
FIG. 3 is a longitudinal cross-sectional view similar to FIG. 2, but with the shaft of the quick connect fluid connector swivel in a retracted condition.
Figure 4:
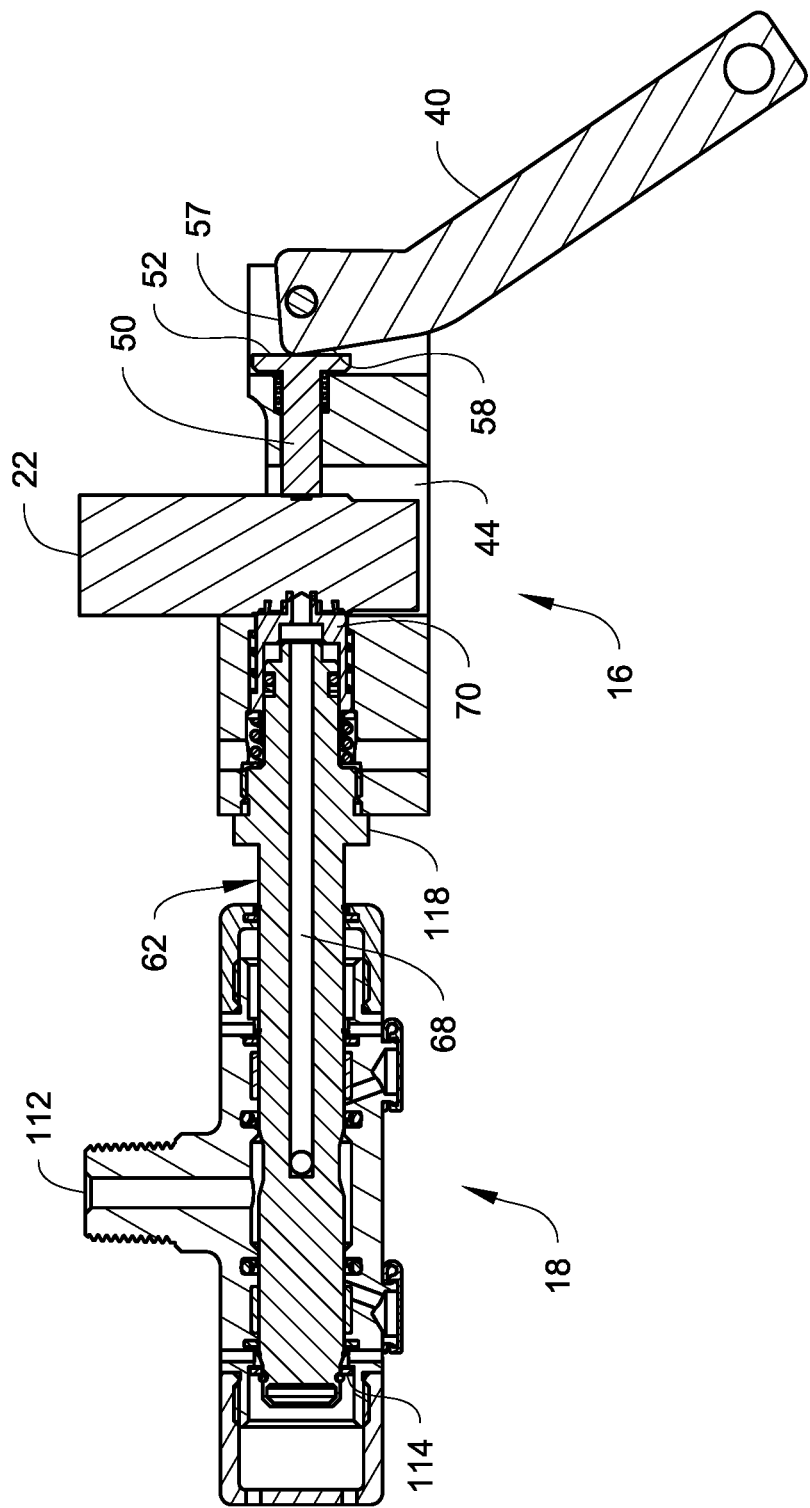
FIG. 4 is a longitudinal cross-sectional view similar to FIG. 2, but sectioned on a plane 90 degrees to the plane of FIG. 2.

A passage 48 extends between the recess 44 and the area between the arms 38a, b, and an actuating pin 50 is slideably disposed within the passage 48. The actuating pin 50 includes an enlarged end 52 that is engaged with the actuating lever 40, and the opposite end of the actuating pin 50 is engaged with the valve assembly 22. A coil spring 54 is engaged between the enlarged end 52 and a shoulder formed in the passage 48, and biases the enlarged end 52 into continuous engagement with the actuating lever 40. The actuating lever 40 includes a first surface 57 that is engaged with the enlarged end 52 in an open position of the connector 16 (as shown in FIG. 3), and a second surface 58 that is engaged with the enlarged end 52 in a connected position (as shown in FIG. 4). As the actuating lever 40 is rotated about the pin 42, the surface 58 is brought into contact with the enlarged end 52 of the actuating pin 50, thereby forcing the pin 50 inward toward the recess 44. Since the actuating pin 50 is engaged with the valve assembly 22, the valve assembly 22 is forced toward the swivel connection end 36 by the actuating pin 50. Rotation of the actuating lever 40 back in the opposite direction brings the surface 57 back into contact with the enlarged end 52, which allows the actuating pin 50 to retract back to the open or disconnected position due to the biasing force of the spring 54.

A bore 60 extends completely through the swivel connection end 36, with the bore 60 extending parallel to the longitudinal axis of the housing 30. A shaft 62 that extends from the swivel 18 is screwed into the swivel connection end 36 within the bore 60, with a space being defined between the outer surface of the shaft 62 and the surface defining the bore 60. The shaft 62 includes a shaft first end 64 within the fluid connector 16, a shaft second end 66 within the swivel 18, a shaft axis that is coaxial to the longitudinal axis, a shaft fluid passageway 68 formed therein along the shaft axis and extending from the shaft first end 64 in a direction toward the shaft second end 66. The shaft fluid passageway 68 allows fluid to flow from the fluid connector 16 to the swivel 18 via the shaft 62.

A cylindrical piston 70 is slideably disposed within the bore 60 and extends into the recess 44 for sealing engagement with the valve assembly 22. The piston 70 includes a skirt portion 72 extending from a head portion 74, with the skirt portion 72 being slideably engaged on the outer surface of the shaft 62 and the interior surface of the housing that defines the bore 60, within the space therebetween. Referring to FIGS. 3 and 4, a neck 76 extends from the head portion 74 into the recess 44, with an o-ring seal 78 disposed in the end of the head portion 74 surrounding the neck 76. The neck 76 and the o-ring seal 78 permit the piston 70 to sealingly engage with the valve assembly as shown in FIG. 4, such that gas leaks are prevented. A central fluid passageway 80 extends through the head portion 74 parallel to the passageway 68, with an o-ring seal 82 disposed in a circumferential channel in the outer surface of the shaft 62 preventing fluid leakage between the skirt portion 72 and the shaft 62.

In order to bias the piston 70 toward the valve assembly 22, a coil spring 84 is disposed within the space between the shaft 62 and the housing 30, with one end of the spring 84 engaged with the shaft 62 and the other end of the spring 84 engaged with a washer 86 slideably disposed within the space. Movement of the washer 86 is limited by a shoulder formed on the surface defining the bore 60, with the washer 86 engaging against a shoulder formed on the skirt portion 72 to bias the piston 70 to toward the end 32 until the washer 86 engages the shoulder.

A further coil spring 92 surrounds the skirt portion 72 and is engaged between the housing 30 and the shoulder to bias the piston 70 toward the end 36, away from the recess 44 and against the bias of the spring 84. The biasing force of the spring 84 is greater than the biasing force of the spring 92, such that the piston 70 is biased to the initial position shown in FIG. 3. Since the spring 92 is disposed around the skirt portion 72, the gas flowing through the fluid connector 16 does not come into contact spring 92 thereby providing smooth gas flow as well as preventing contamination build-up by the spring 92.

The piston 70 further includes an interior pressure surface 94 thereon which is engaged by the gas flowing through the passageway 68 in order to force the piston 70 toward the recess 44 to enhance the sealing effect between the piston 70 and the valve assembly 22. As can be seen in FIG. 3, a slight gap exists between the pressure surface 94 and the end of the shaft 62 to permit the gas to engage the pressure surface 94 and thereby force the piston 70 toward the recess 44.

Further details on the construction of the fluid connector 16 can be found in U.S. Pat. No. 6,073,909. The lever 40, the actuating pin 50, and the piston 70 together form a connection mechanism that releasably mechanically connect the fluid connector 16 to the valve assembly 22. However, other forms of connection mechanisms that releasably mechanically connect the fluid connector 16 to the valve assembly 22 can be used.

With reference to FIGS. 2-4 and 13, the swivel 18 includes a housing 100 having a housing first end 102, a housing second end 104, and a longitudinal axis extending from the housing first end 102 to the housing second end 104. A housing passageway 106 is formed in the housing 100 along the longitudinal axis, with the housing passageway 106 extending through the housing first end 102. A first end cap 108 is removably threaded onto the housing 100 to define the housing first end 102 and a second end cap 110 is removably threaded onto the housing 100 to define the housing second end 104. The housing passageway 106 extends through the first end cap 108 which is open to allow passage of the shaft 62. The second end cap 110 defines a closed end of the swivel 18 although the second end cap 110 can have one or more passages.

The housing 100 further includes a fluid port 112 formed therein that is in fluid communication with the housing passageway 106. In the example illustrated in FIGS. 1-4, the fluid port 112 is formed in a side of the housing 100 between the housing first end 102 and the housing second end 104. The fluid port 112 can extend perpendicularly from the housing 100 or at a non-ninety degree angle from the housing 100. Alternatively, as discussed further below with respect to FIG. 10, the fluid port 112 can extend axially through the housing second end 104. The fluid port 112 is configured to be attached to the port 20 on the fluid manifold 12 in order to attach the swivel 18 to the fluid manifold. The attachment of the fluid port 112 to the port 20 can be achieved using any suitable attachment mechanism. For example, the fluid port 112 can have threads 113 which are engageable with matching threads (not shown) of the port 20 so that the swivel 18 can be attached to the fluid manifold 12 via the threads 113. The threads 113 would also permit the swivel 18 to be detached from the fluid manifold 12. A permanent form of attachment could also be used, such as the fluid port 112 being welded to the port 20.

The shaft 62 is disposed in the housing passageway 106 so that the shaft 62 is rotatable relative to the housing 100 about the shaft axis, and the shaft 62 is also longitudinally or axially displaceable relative to the housing 100 in a direction parallel to the shaft axis. A first stop is provided that limits longitudinal/axial displacement of the shaft 62 relative to the housing 100 in a first longitudinal direction and a second stop is provided that limits longitudinal/axial displacement of the shaft 62 relative to the housing 100 in a second longitudinal direction.

Figure 13:
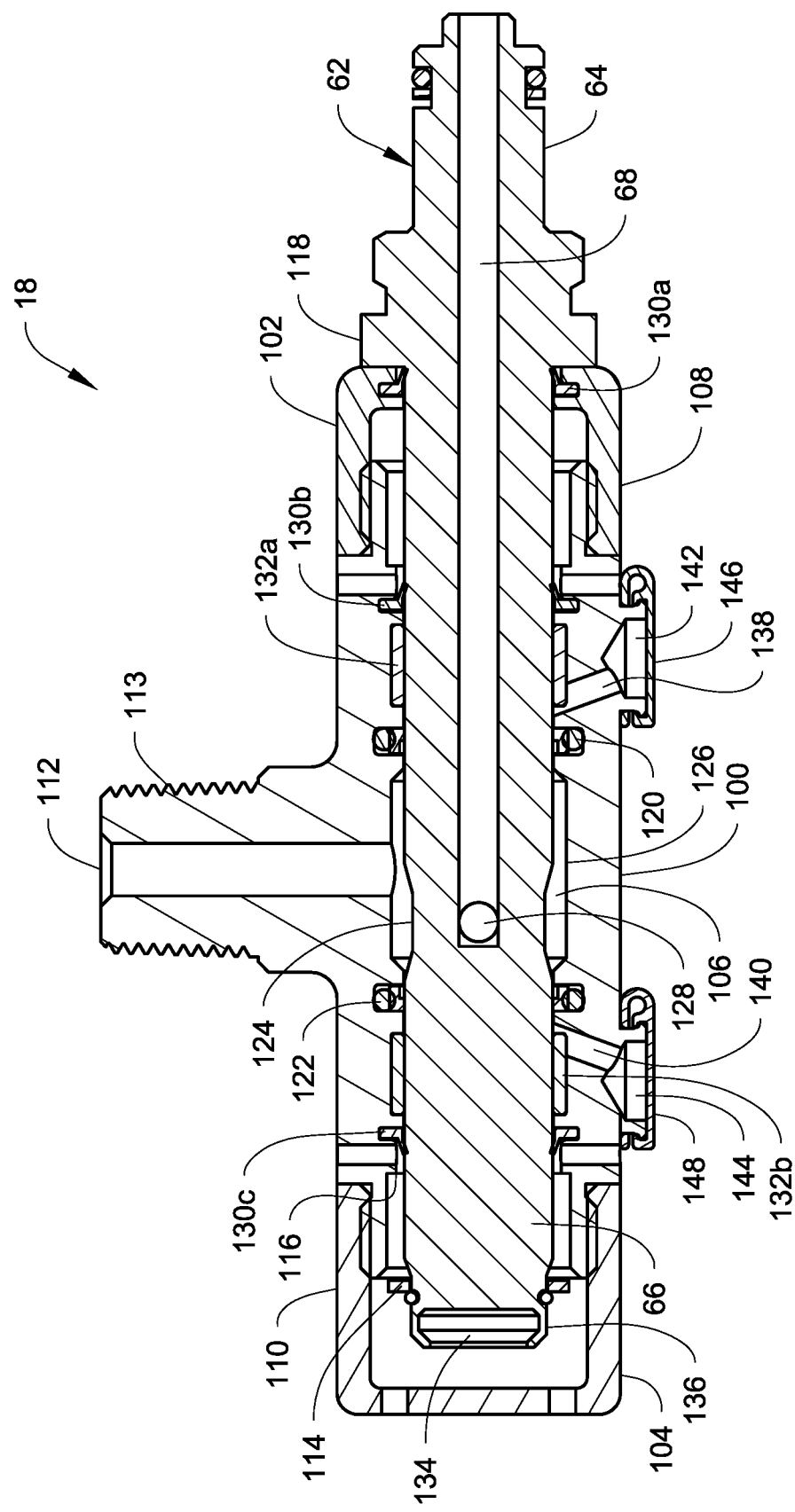
FIG. 13 is a detailed longitudinal cross-sectional view of the quick connect fluid connector swivel of FIGS. 2-4.

For example, as best seen in FIG. 13, the first stop can comprise a washer 114 that is disposed around and fixed to the shaft 62 near the second end 66. The washer 114 projects radially from the outer diameter of the shaft 62 and is configured to abut against a shoulder 116 defined within the housing 100 (as shown in FIG. 4) to define a maximum extended position of the shaft 62. In this example, the washer 114 and the shoulder 116 together form the first stop. The second stop can comprise a ring 118, which can be circumferentially continuous, formed on the shaft 62 and projecting radially therefrom where the shaft 62 extends from the fluid connector 16. The ring 118 is designed to abut against the first end cap 108 as shown in FIGS. 3 and 13 to define a maximum retracted position of the shaft 62. In this example, the ring 118 and the first end cap 108 together form the second stop.

In one embodiment, the shaft 62 can be biased to return to a home position in a disconnected state so that the swivel 18 is ready for the next connection. For example, the shaft 62 can be biased to a longitudinal home position to return to a longitudinal home position. In another example, the shaft 62 can be biased circumferentially or rotationally to return to a circumferential or rotational home position. In another example, the shaft 62 can be biased both longitudinally and circumferentially to return to the longitudinal home position and the circumferential home position.

Referring to FIGS. 2-4 and 13, a first circumferential seal 120 seals between the exterior surface of the shaft 62 and the interior surface of the housing 100 at a location that is between the fluid port 112 and the housing first end 102. In addition, a second circumferential seal 122 is spaced from the first seal 120 and seals between the exterior surface of the shaft 62 and the interior surface of the housing 100 at a location that is between the fluid port 112 and the housing second end 104. Between the two seals 120, 122 the shaft 62 is provided with a reduced diameter section 124. The reduced diameter section 124 remains located between the two seals 120, 122 at both the maximum retracted position (FIG. 3) and the maximum extended position (FIG. 4). In addition, the housing passageway 106 includes an increased diameter section 126 between the two seals 120, 122 and located at the fluid port 112. Further, the shaft fluid passageway 68 includes a transverse portion 128 that exits through the shaft 62 at the reduced diameter section 124 and between the first seal 120 and the second seal 122. As a result, fluid can flow through the fluid port 112, into the transverse portion 128, and then through the fluid passageway 68 to the fluid connector 16, and vice versa. In addition, the transverse portion 128, the reduced diameter section 124 and the increased diameter section 126 form a pressure balance zone between the seals 120, 122 that pressure balance the swivel 18. The seals 120, 122 prevent leaks of the fluid from the pressure balance zone.

Wipers 130a, 130b, 130c can also be provided around the circumference of the shaft 62 at select locations thereon to help keep contaminants out of the interior of the housing 100. In addition, bushings 132a, 132b or other types of bearings can be provided between the housing 100 and the circumference of the shaft 62 to facilitate rotation and axial/longitudinal sliding of the shaft 62 relative to the housing 100.

Further, as shown in FIGS. 2-4 and 13, the second end 66 of the shaft 62 is formed with a generally hollow section 134 with a surrounding circumferential lip 136. The hollow section 134 and lip 136 form a crumple zone on the shaft 62 which will help absorb kinetic energy in the event that the swivel 18 is over-pressurized such that the shaft 62 factures and comes into contact with the second end cap 110. In an alternative embodiment, a crumple zone similar in construction to the crumple zone (e.g. the hollow section 134 and the lip 136) on the shaft 62 could be formed on the second end cap 110. The crumple zone on the second end cap 110 could be used by itself or together with the crumple zone on the shaft 62.

Figure 5:
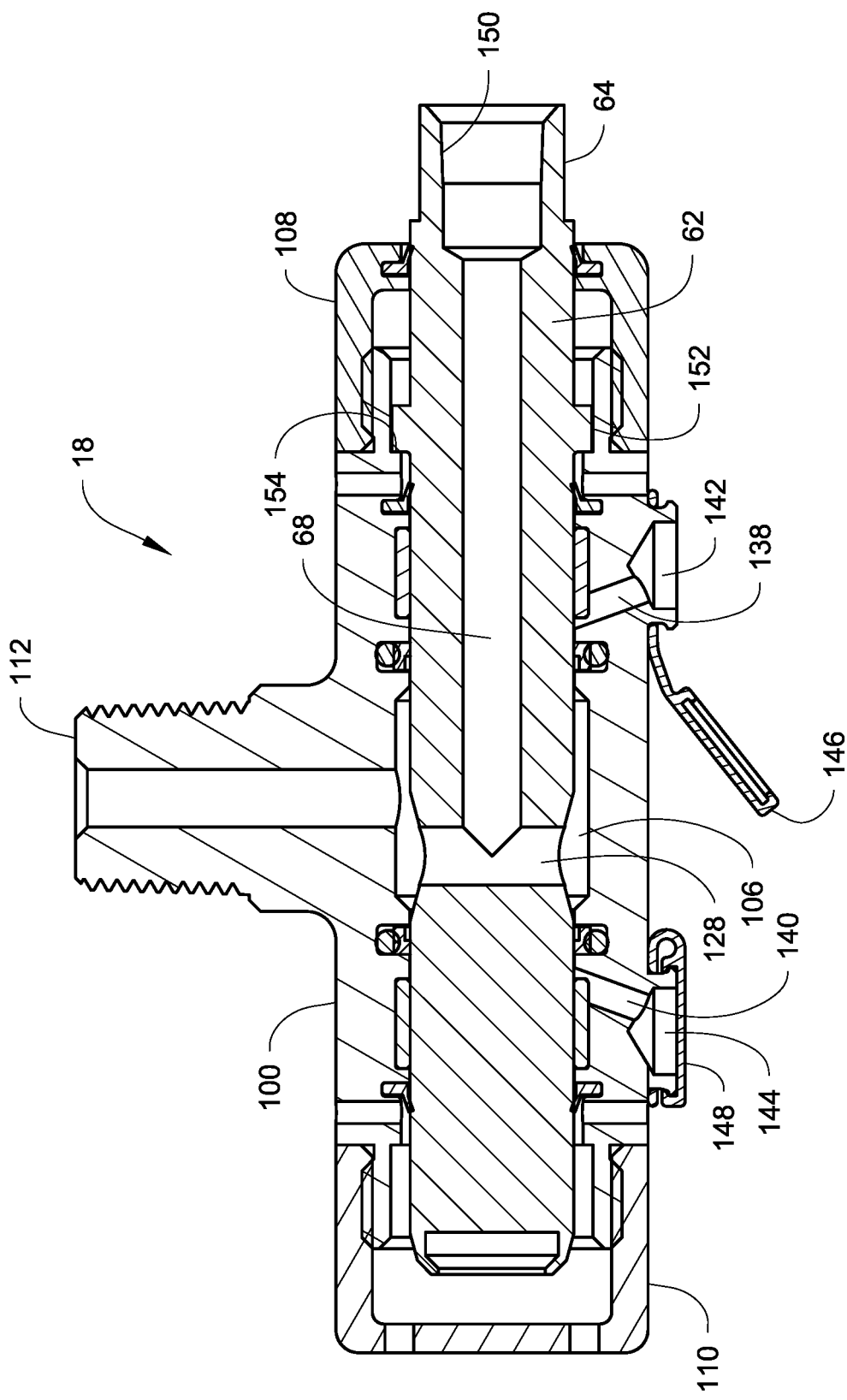
FIG. 5 is a longitudinal cross-sectional view of another embodiment of a quick connect fluid connector swivel with the shaft in a retracted condition.

In the illustrated embodiment, the swivel 18 is also provided with one or more leak indicators to indicate fluid leaks past either one of, or both of, the seals 120, 122. The leak indicators can have any construction that is suitable for indicating, visually or electronically, fluid leaks past the seals 120, 122. For example, referring to FIGS. 3, 4 and 13, a first leak indicator passageway 138 is provided through the housing 100 that intersects the housing passageway 106 at a location between the first seal 120 and the housing first end 102. A second leak indicator passageway 140 is provided through the housing 100 that intersects the housing passageway 106 at a location between the second seal 122 and the housing second end 104. The leak indicator passageways 138, 140 extend to respective leak ports 142, 144 formed in the housing 100. The leak ports 142, 144 are closed by caps 146, 148. As depicted in FIG. 5, the caps 146, 148 can pop open in the event that there is a leak past one of the seals 120, 122, where the leaking fluid would flow through the indicator passageway(s) 138, 140 and if the pressure caused by the leak is significant enough, cause the cap(s) 146, 148 to pop open.

Figure 11A:
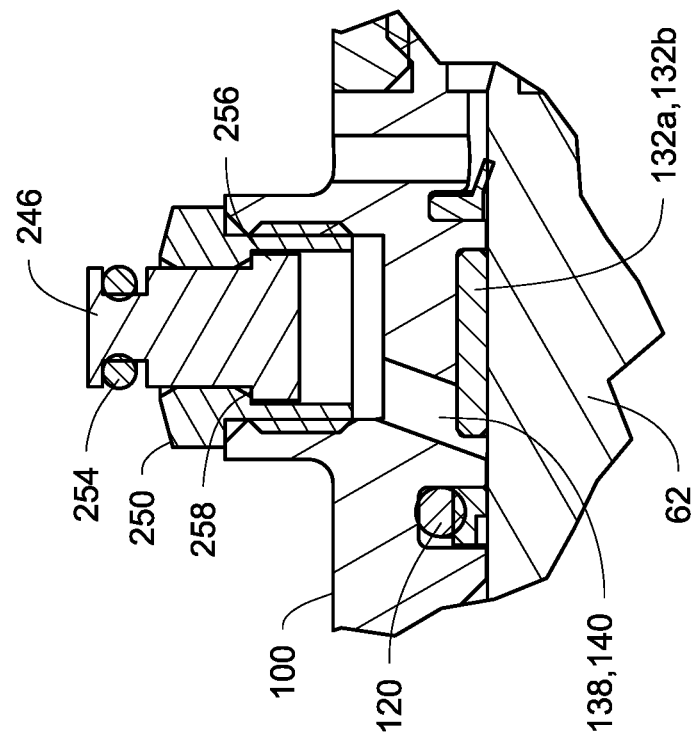
FIGS. 11A and 11B are cross-sectional views of another embodiment of a leak indicator.
Figure 11B:
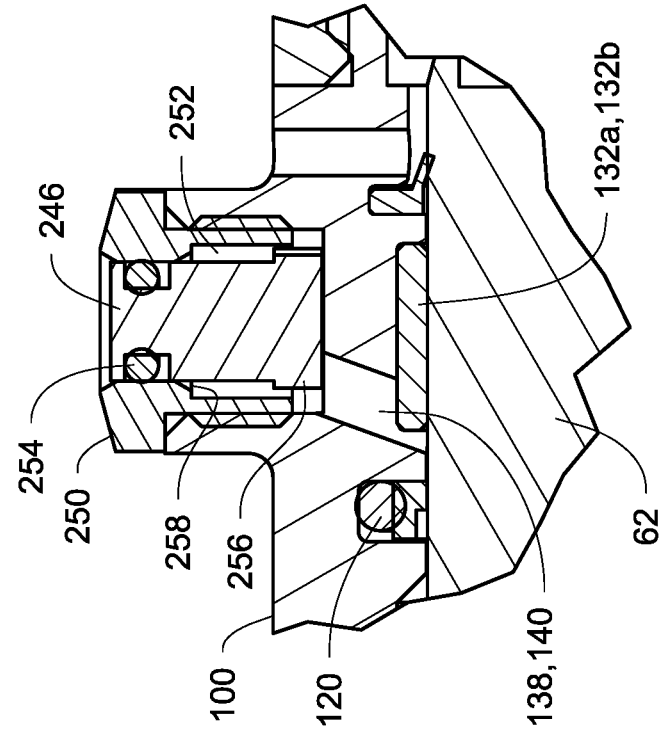

Other leak indicators are possible. For example, referring to FIGS. 11A and 11B, instead of using the caps 146, 148, the leak indicators can be formed by a poppet 246. In particular, a poppet housing 250 can be secured within each leak port. The poppet housing 250 has a passage 252 that receives the poppet 246. The poppet 246 includes a seal 254 that seals with the passage 252. The poppet 246 initially has a retracted position shown in FIG. 11A. If a leak occurs and sufficient pressure is generated, the poppet 246 is pushed upward above the poppet housing 250 as shown in FIG. 11B which will indicate a leak. The travel of the poppet 246 is limited by a shoulder 256 formed on the poppet 246 that engages with a shoulder 258 formed on the poppet housing 250.

Figure 12A:
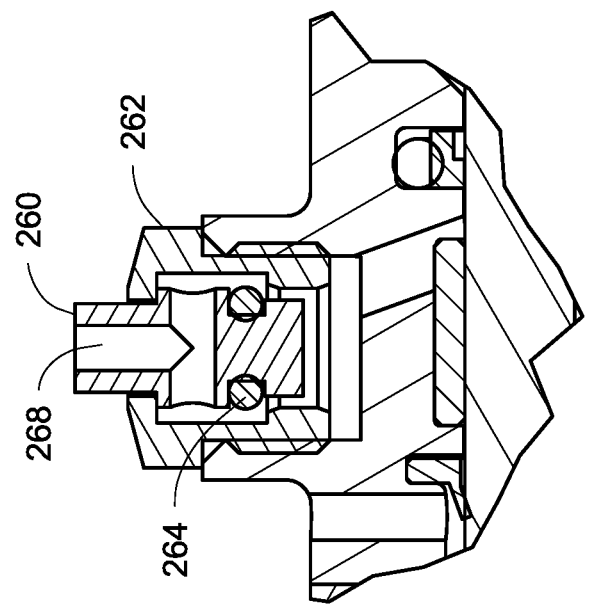
FIGS. 12A and 12B are cross-sectional views of another embodiment of a leak indicator.
Figure 12B:
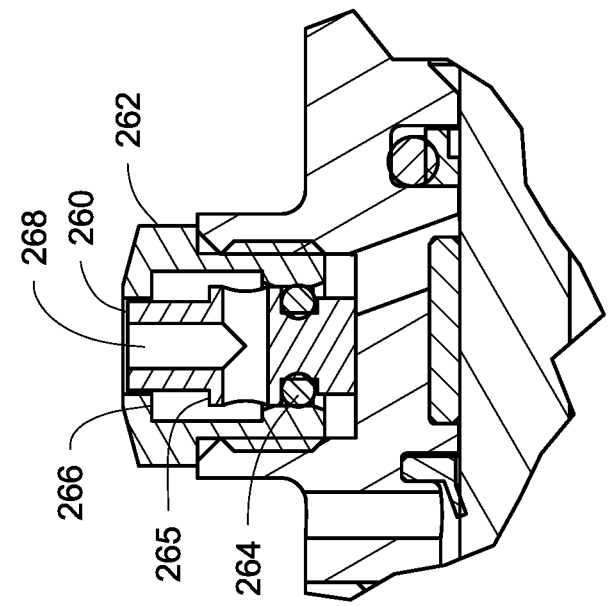

FIGS. 12A and 12B illustrate another embodiment of a leak indicator. This embodiment also uses a poppet 260 that is received within a passage of a poppet housing 262 secured to the leak port. The poppet 260 includes a seal 264 that seals with the passage when the poppet 260 is initially in its retracted position shown in FIG. 12A. If a leak occurs and sufficient pressure is generated, the poppet 260 is pushed upward above the poppet housing 262 as shown in FIG. 12B which will indicate a leak. The travel of the poppet 260 is limited by a shoulder 265 formed on the poppet 260 that engages with a shoulder 266 formed on the poppet housing 262. The poppet 260 can also include vent passages 268 that permit venting of any fluid that leaks.

The operation of the fluid connector 16 and the swivel 18 should be apparent from the above description. With the fluid connector 16 initially disposed in the unconnected position shown in FIG. 3, the fluid connector 16 is disposed around the valve assembly 22 with the shaft 62 of the swivel 18 accommodating axial and rotational adjustments of the fluid connector 16 to permit placement of the fluid connector 16 in proper positon around the valve assembly 22. The actuating lever 40 is then rotated to bring the surface 58 into engagement with the enlarged end 52 of the actuating pin 50, thereby forcing the actuating pin 50 toward the valve assembly 22 which forces the valve assembly 22 into sealed engagement with the piston 70. The piston 70 is thereby forced toward the swivel 18, against the bias of the spring 84, leaving the gap between the pressure surface 94 of the piston 70 and the end of the shaft 62. The valve on the valve assembly 22 is then opened, thereby permitting gas to flow through the fluid connector 16, the swivel 18 and through the valve assembly whether during a fill operation on the gas container 14 or during evacuation of the gas container 14. Due to the gap, the piston 70 is forced toward the valve assembly 22 by the pressure of the fluid acting on the surface 94, thereby increasing the sealing effect between the valve assembly 22 and the piston 70.

Figure 2:
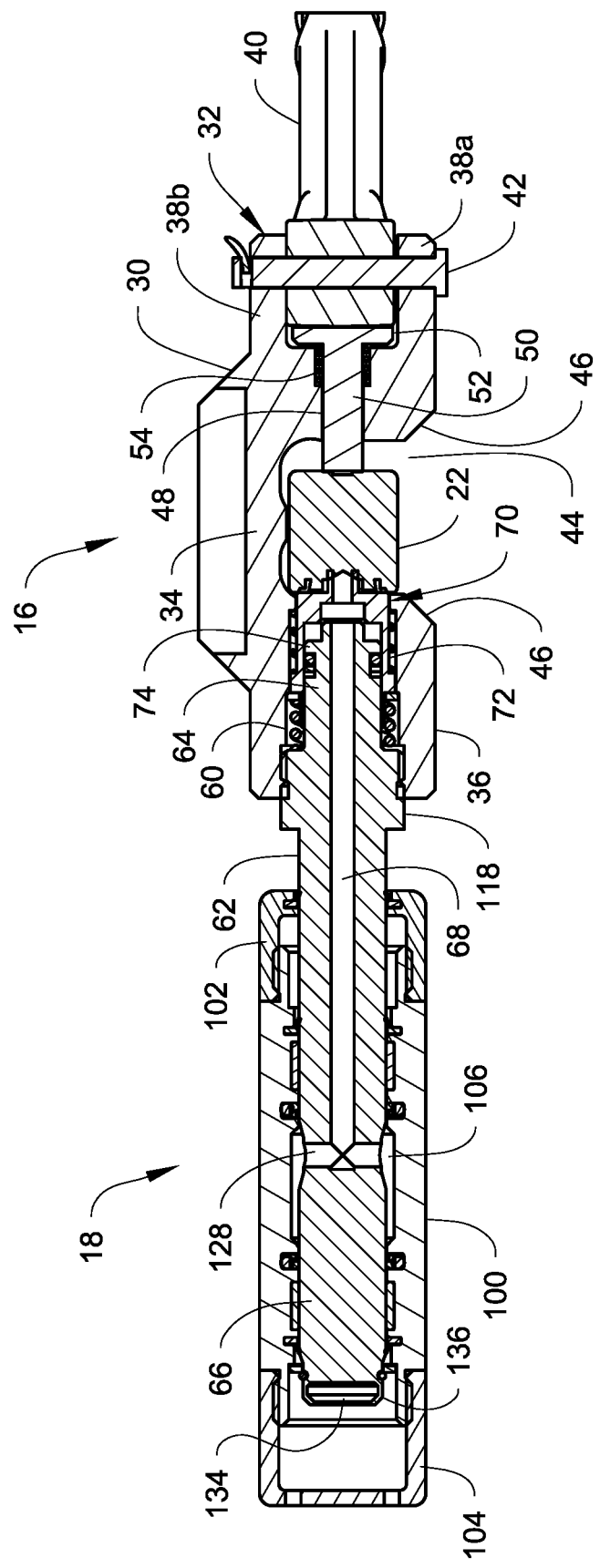
FIG. 2 is a longitudinal cross-sectional view of the combination of the quick connect fluid connector swivel and the quick connect fluid connector in FIG. 1.
Figure 6:
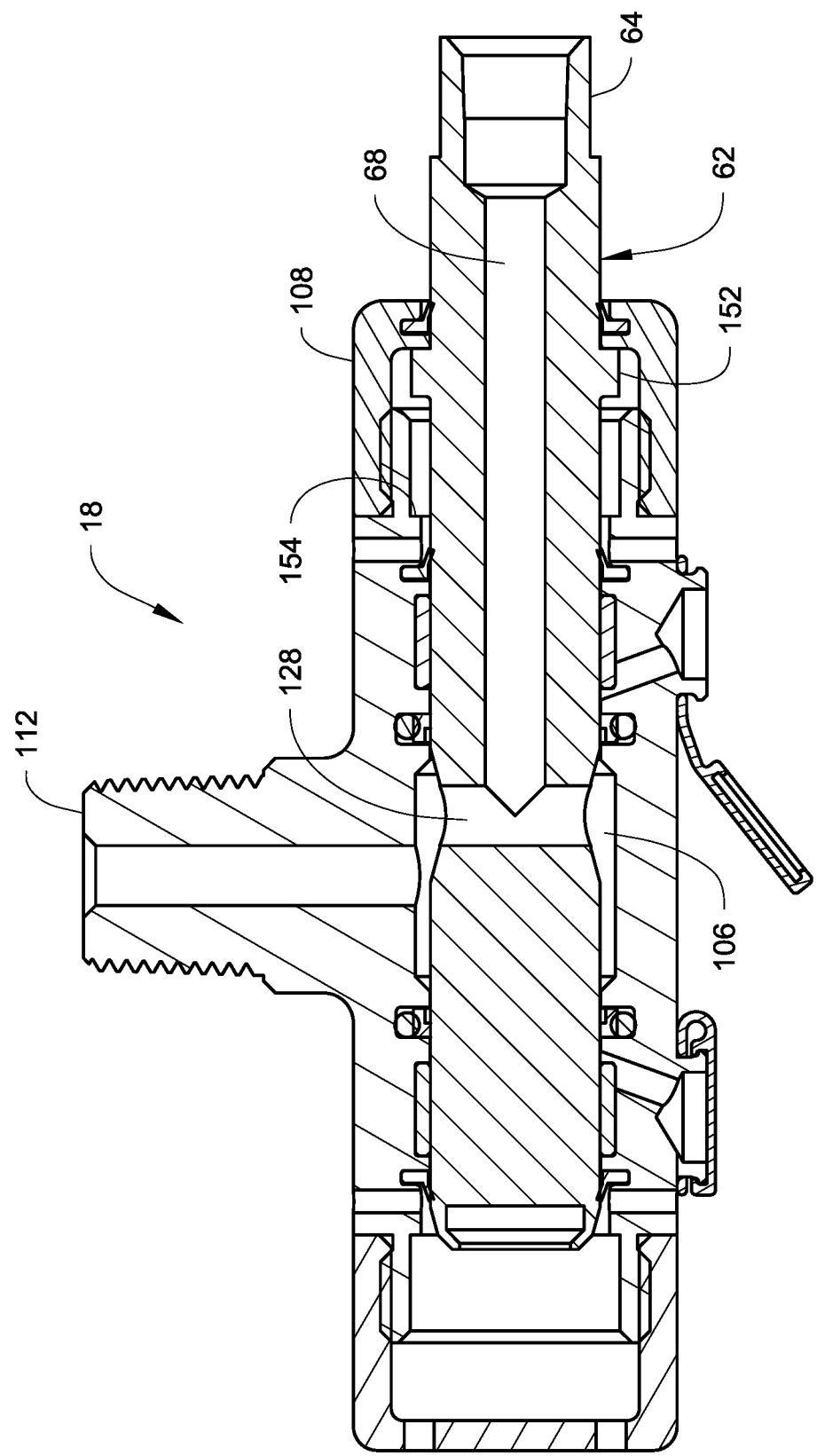
FIG. 6 is a longitudinal cross-sectional view of the quick connect fluid connector swivel of FIG. 5 with the shaft in an extended condition.
Figure 7:
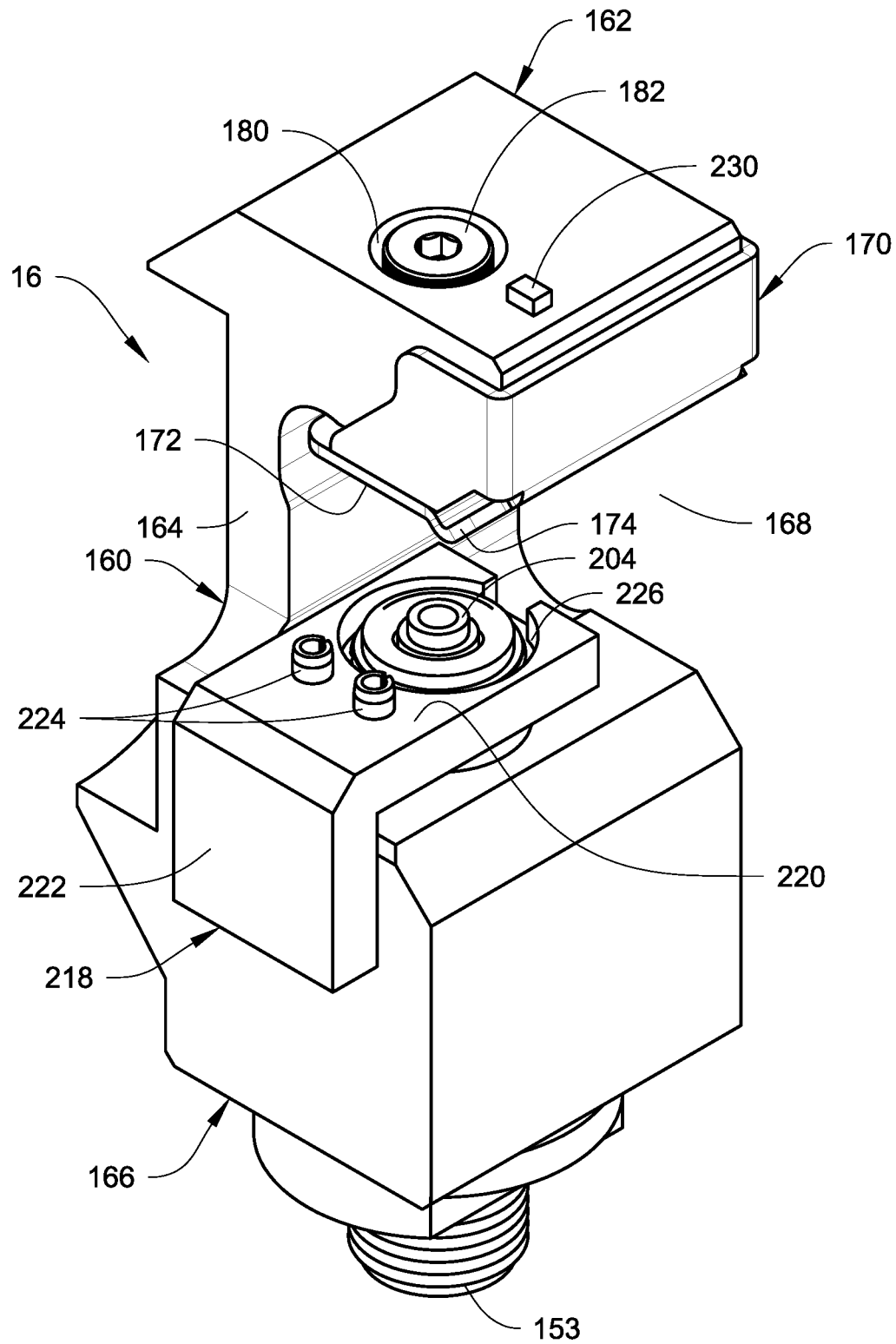
FIG. 7 is a perspective view of a pneumatic quick connect fluid connector that can be detachably affixed to one of the quick connect fluid connector swivels described herein.
Figure 8:
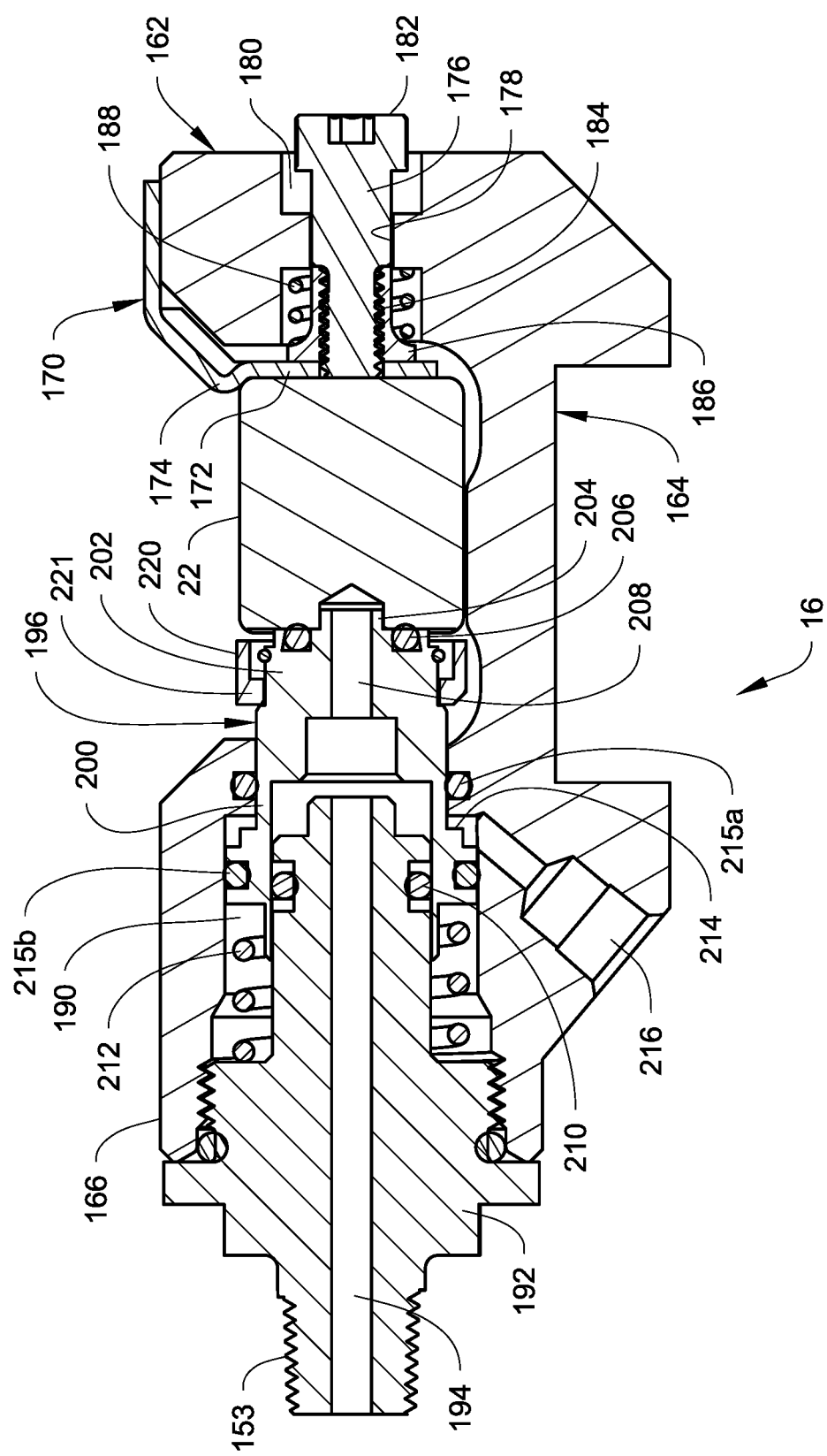
FIG. 8 is a longitudinal cross-sectional view of the pneumatic quick connect fluid connector of FIG. 7.

In the embodiment illustrated in FIGS. 2-4, the shaft 62 is a single, unitary piece shared by the fluid connector 16 and the swivel 18. However, other embodiments are possible. For example, FIGS. 5-6 illustrate another version of the swivel 18 where elements similar to elements in the swivel in FIGS. 2-4 are referenced using the same reference numbers. In FIGS. 5-6, the shaft 62 of the swivel 18 is not unitary with the fluid connector 16. Instead, the shaft first end 64 is threaded 150 so as to be detachably affixed to a threaded part 153 (seen in FIGS. 7-8) of the fluid connector. The fluid connector can have a configuration as illustrated in FIGS. 2-4, a configuration as shown in FIGS. 7-8 and discussed further below, or any other configuration, such as the configurations disclosed in U.S. Pat. Nos. 6,073,909 and 8,844, 979.

The swivel 18 in FIGS. 5-6 also differs from the swivel 18 in FIGS. 2-4 in that the swivel 18 in FIGS. 5-6 uses a different configuration of first and second stops to limit axial travel of the shaft 62. In particular, in FIGS. 5-6, the shaft 62 includes a ring 152 which can be circumferentially continuous, formed on the shaft 62 within the housing 100 and projecting radially from the shaft 62. The ring 152 is designed to abut against the first end cap 108 as shown in FIG. 6 to define a maximum extended position of the shaft 62, and to abut against an interior shoulder 154 defined within the housing passageway 106 of the housing 100 as shown in FIG. 5 to define a maximum retracted position of the shaft 62. Therefore, in this example, the ring 152 and the first end cap 108 together form the first stop, and the ring 152 and the shoulder 154 together form the second stop.

In FIGS. 5-6, once the threaded part 153 of the fluid connector 16 is threaded onto the threaded 150 end of the shaft 62, the combined fluid connector 16 and swivel 18 will function identically to the fluid connector 16 and the swivel 18 described in FIGS. 2-4.

FIGS. 7-8 illustrate an alternative embodiment of the fluid connector 16. In this embodiment, the fluid connector 16 is not manually actuated using the actuating lever 40. Instead, the fluid connector 16 in this embodiment uses pneumatics to help achieve connection to the valve assembly 22.

The fluid connector 16 includes an elongated housing 160 having an indicator end 162, a central section 164 and a swivel connection end 166. A recess 168 is formed through one side of the housing 160 at the central section 164, with the recess 168 being sized so as to receive the valve assembly 22 therein.

The indicator end 162 includes a spring loaded slide clip 170 that facilitates connection to the valve assembly 22. As best seen in FIG. 8, the clip 170 has a generally planar section 172 where the clip 170 engages with the valve assembly 22, and a raised shoulder 174 along one side of the planar section 172 away from the recess 168. An indicator pin 176 extends through an opening 178 in the indicator end 162. The opening 178 includes a recessed end 180 into which an enlarged head 182 of the pin 176 can be recessed as shown in FIG. 7. The end of the pin 176 is threaded 184 and is threaded into a threaded opening of a retainer 186 that extends upwardly into the opening 178 and is fixed to the clip 170. A coil spring 188 abuts against the retainer 186 and biases the retainer 186 which is fixed to the clip 170 so as to bias the clip 170 toward the recess 168 and the valve assembly 22. The retainer 186 can be fixed to the clip 170 in any suitable manner, for example by welding or press fit.

In an unconnected condition of the fluid connector 16, the spring 188 biases the pin 176 and the clip 170 toward the recess 168 and the valve assembly 22 so that the head 182 of the pin 176 is retracted into the recessed end 180, for example entirely below the outer surface of the fluid connector as shown in FIG. 7. However, in a connected condition of the fluid connector 16, the clip 170 is forced away from the swivel connection end 166 which also forces the pin 176 in a direction away from the swivel connection end 166. This forces the head 182 of the pin 176 to project from the recessed end 180 as illustrated in FIG. 8 to indicate that the fluid connector is connected to the valve assembly 22.

A bore 190 extends completely through the swivel connection end 166, with the bore 190 extending parallel to the longitudinal axis of the housing 160. A shaft 192 is screwed into the swivel connection end 166 within the bore 190, with a space being defined between the outer surface of the shaft 192 and the surface defining the bore 190. The shaft 192 includes an end disposed within the fluid connector, and an end disposed outside the fluid connector that includes the threaded part 153. The shaft 192 further includes a shaft axis that is coaxial to the longitudinal axis, and a shaft fluid passageway 194 formed therein along the shaft axis. The shaft fluid passageway 194 allows fluid to flow from the fluid connector 16 to the swivel 18 via the shaft 192.

A cylindrical piston 196 is slideably disposed within the bore 190 and extends into the recess 168 for sealing engagement with the valve assembly 22. The piston 196 includes a skirt portion 200 extending from a head portion 202, with the skirt portion 200 being slideably engaged on the outer surface of the shaft 192 and the interior surface of the housing that defines the bore 190, within the space therebetween. A neck 204 extends from the head portion 202 into the recess 168, with an o-ring seal 206 disposed in the end of the head portion 202 surrounding the neck 204. The neck 204 and the o-ring seal 206 permit the piston 196 to sealingly engage with the valve assembly 22 to prevent gas leaks. A fluid passageway 208 extends through the head portion 202 parallel to the passageway 194, with an o-ring seal 210 disposed in a circumferential channel in the outer surface of the shaft 192 preventing fluid leakage between the skirt portion 200 and the shaft 192.

A coil spring 212 is disposed between the shaft 192 and the end of the piston 196 in order to bias the piston 196 toward the valve assembly 22. The piston 196 further includes a pressure surface 214 that is between two seals 215*a*, 215*b* creating a pressure chamber which is in fluid communication with a fluid input 216. When a fluid such as air is introduced through the fluid input 216, the fluid acts against the pressure surface 214, retracting the piston 196 against the bias of the spring 212.

Referring to FIGS. 7 and 8, a pin plate 218 is also provided on the fluid connector 16. The pin plate 218 has an L-shaped configuration with a first portion 220 within the recess 168 and a second portion 222 along the side of the housing 160. The first portion 220 of the pin plate 218 is provided with a pair of pins 224 for engaging with pin recesses on the valve assembly 22. The first portion 220 of the pin plate 218 also includes a recess 226 that surrounds the neck 204 and the seal 206 of the piston 196.

The pin plate 218 is removable to allow use of different configurations of the pins 224 without requiring changing the housing 160. In addition, as depicted in FIG. 7, in the unconnected position of the fluid connector 16 and with fluid applied through the fluid input 216, the piston 196 is retracted, which retracts the neck 204 and the seal 206 within the recess 226. The seal 206 will retract below the surface of the first portion 220 of the pin plate 218 to protect the seal 206. The neck 204 will also retract but the tip thereof may remain above the surface of the first portion 220 of the pin plate 218. Although the pin plate 218 will also retract when the piston 196 retracts, the amount of retraction of the pin plate 218 is less than the amount of retraction of the piston 196. This retraction of the neck 204 and the seal 206 helps to minimize damage to the neck 204 and the seal 206 by minimizing contact with the valve assembly 22 during installation and removal of the fluid connector 16. The pin plate 218 is secured by a ring 221 around the head portion 202 to locate the pin plate 218 and still allow movement of the piston 196.

The slide clip 170, the pin 176, the piston 196 and the pin plate 218 together form a connection mechanism that releasably mechanically connect the fluid connector 16 to the valve assembly 22. However, other forms of connection mechanisms that releasably mechanically connect the fluid connector 16 to the valve assembly 22 can be used.

In operation of the fluid connector 16 of FIGS. 7 and 8, to connect to the valve assembly 22, the fluid connector 16 is initially in the configuration shown in FIG. 7. Fluid is applied through the fluid input 216 to retract the piston 196 thereby retracting the neck 204 and the seal 206. The valve assembly 22 is then installed into the recess 168 of the fluid connector 16, with the valve assembly 22 initially held in place by the spring load of the clip 170 biased by the coil spring 188 against the valve assembly 22 which aligns onto the pin plate 218 over the alignment pins 224. The fluid through the input 216 is then removed so that the spring 212 biases the piston 196 into engagement with the valve assembly 22 and forces the valve assembly 22 toward the indicator end 162. The valve assembly 22 is therefore clamped between the piston 196 and the planar section 172 of the clip 170, with the head 182 of the pin 176 projecting from the recessed end 180 as illustrated in FIG. 8 to indicate that the fluid connector is connected to the valve assembly 22.

A connection indicator other than the head 182 of the pin 176 can be provided. For example, sensors can be integrated into the fluid connector 16 to sense movements of elements such as the piston 196 and/or the pin plate 218 and/or sense the presence/absence of the valve assembly 22, where the sensed movement of elements and/or the sensed presence/absence of the valve assembly 22 can indicate proper or improper connection, or no valve assembly present. The sensor readings can be sent to a controller that prevents the flow of fluid from the fluid manifold 12 to the fluid connector 16 in the event of an improper connection or no valve assembly 22 present. The sensors can be magnetic sensors that sense magnets on the element(s) to be sensed. An example of a magnetic sensing system in a fluid connector for sensing the connection state of the fluid connector is described in U.S. Published Application No. 2017/0037991 (application Ser. No. 15/228,587) titled Fluid Connectors With Connection State Sensing, the entire contents of which are incorporated herein by reference. With reference to FIG. 7, in one non-limiting example, a sensor 230 can be provided on the fluid connector 16 to sense the head 182. During connection, as the clip 170 pushes the pin 176 and the head 182 projects beyond the recessed end 180, the sensor 230 can sense the head 182. If the head 182 is not sensed, that can indicate that a proper connection has not been achieved and fluid flow can be prevented.

Figure 9:
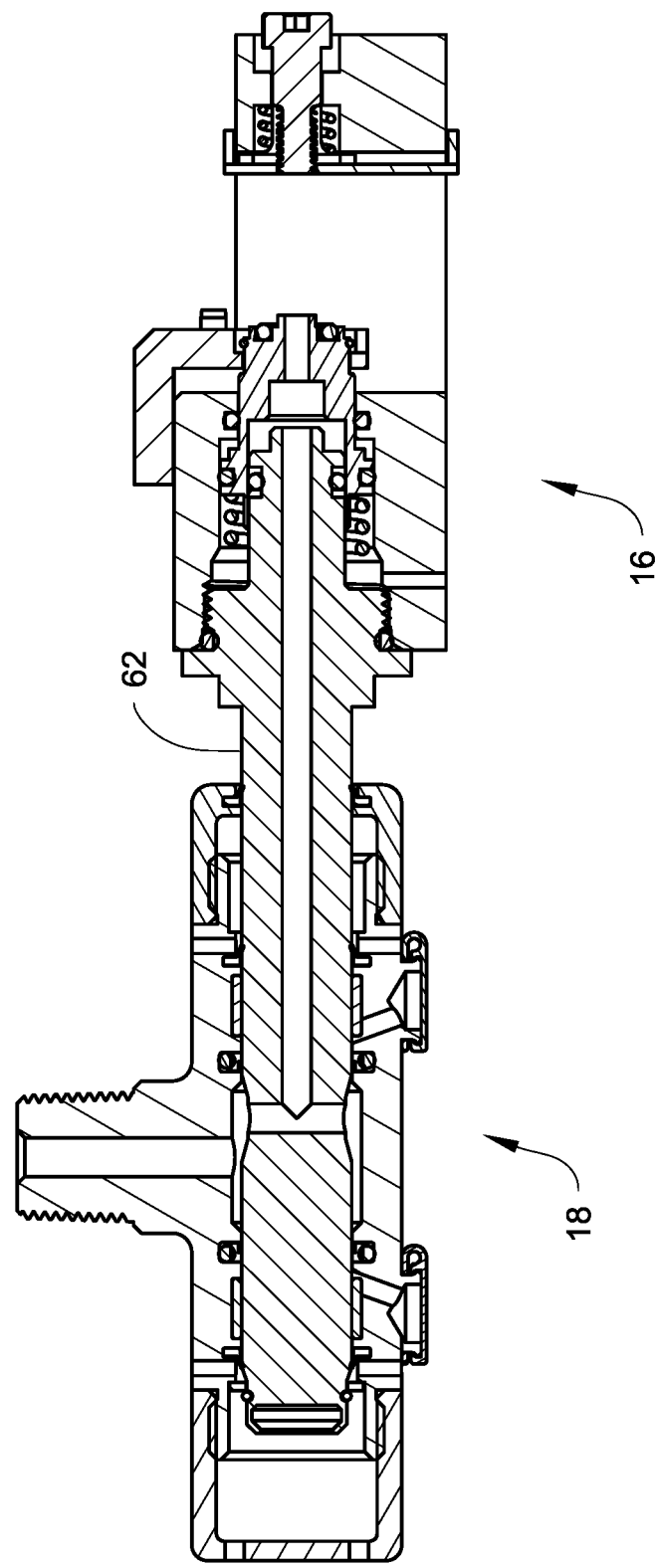
FIG. 9 is a longitudinal cross-sectional view of the pneumatic quick connect fluid connector of FIG. 7 that is integrated with a quick connect fluid connector swivel by using a common shaft.

Referring to FIG. 9, another embodiment is illustrated where the fluid connector 16 of FIGS. 2-4 is replaced with the fluid connector illustrated in FIGS. 7-8. The threaded part 153 in FIGS. 7-8 is not used. Instead, the shaft 62 is similar to the shaft in FIGS. 2-4 and extends from the swivel 18 to the fluid connector 16 so that the shaft 62 is shared between the swivel 18 and the fluid connector 16. The construction and operation of the fluid connector 16 and the swivel 18 in FIG. 9 can be otherwise identical to the construction and operation of the fluid connector 16 described and illustrated in FIGS. 7-8 and the swivel 18 in FIGS. 2-4.

Figure 10:
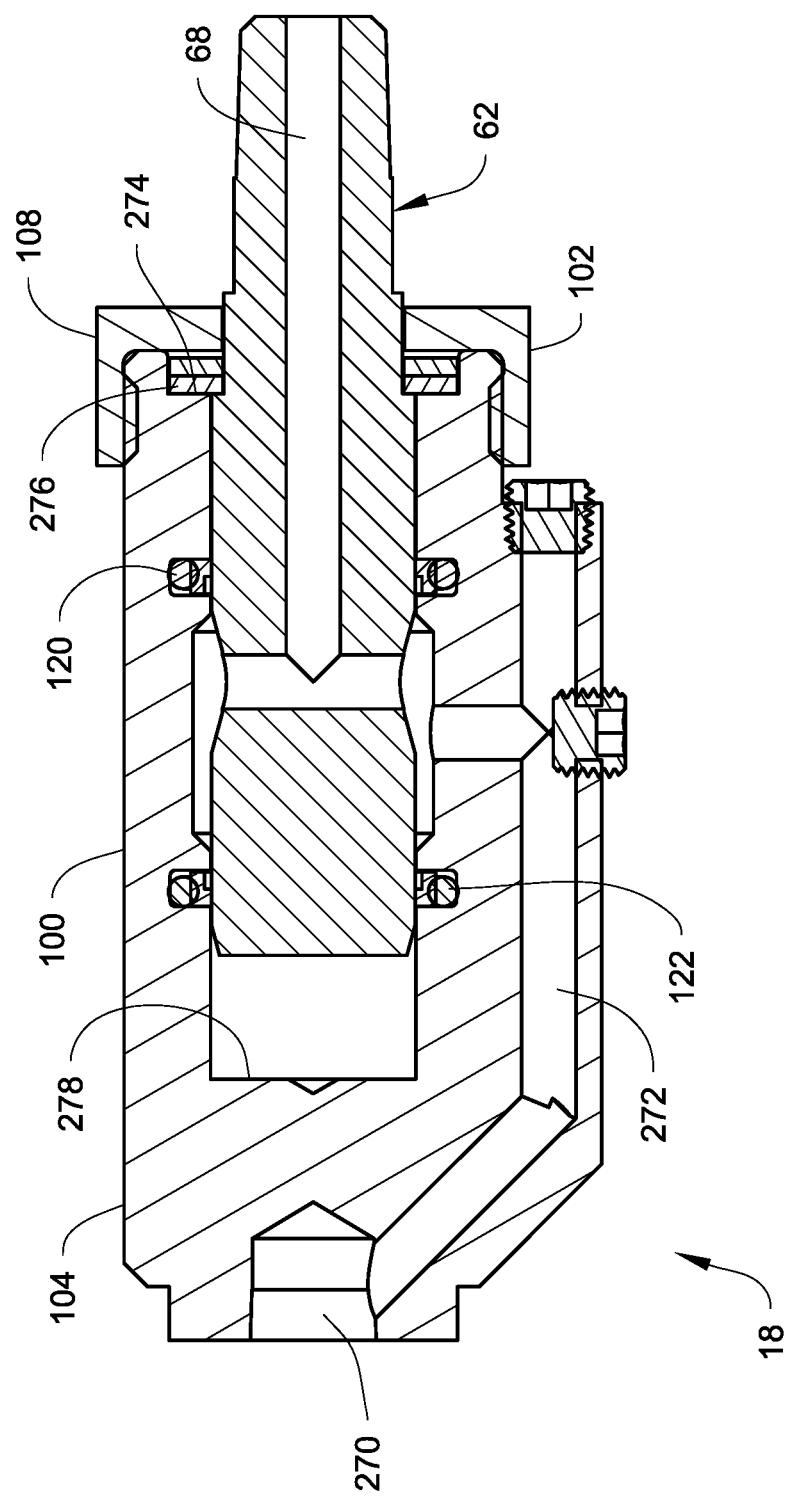
FIG. 10 is a longitudinal cross-sectional view of another embodiment of a quick connect fluid connector swivel.

FIG. 10 illustrates another embodiment of the quick connect fluid connector swivel 18 having an axial fluid port 270 rather than the radial fluid port 112 as in FIGS. 2-4 and 5-6. In FIG. 10, elements that are similar to elements in the swivel in FIGS. 2-4 or FIGS. 5-6 are referenced using the same reference numbers. The swivel 18 in this embodiment can be used with any type of fluid connector, such as the fluid connector 16 of FIGS. 2-4 or the fluid connector of FIGS. 7-8. In FIG. 10, the shaft 62 of the swivel 18 can be configured to be unitary with the fluid connector 16 as in FIGS. 2-4, or the end of the shaft 62 can be threaded so as to be detachably affixed to a threaded part of the fluid connector like in FIGS. 7-8.

In FIG. 10, the housing 100 has the housing first end 102, the housing second end 104, and the longitudinal axis extending from the housing first end 102 to the housing second end 104. The housing passageway 106 is formed in the housing 100 along the longitudinal axis, with the housing passageway 106 extending through the housing first end 102. The first end cap 108 is removably threaded onto the housing 100 to define the housing first end 102. The housing passageway 106 extends through the first end cap 108 which is open to allow passage of the shaft 62.

The fluid port 270 is formed at the second end 104 and extends substantially axially through the second end 104 along the longitudinal axis. The fluid port 270 can have internal threads which are engageable with matching external threads (not shown) of the port 20 on the fluid manifold 12 so that the swivel 18 can be attached to the fluid manifold 12 via the threads. A bypass fluid passageway 272 is formed in the housing 100 and extends between the fluid port 270 and the housing passageway 106 between the two seals 120, 122 to place the fluid port 270 in fluid communication with the fluid passageway 68 through the shaft 62, and creating the pressure balance zone between the seals 120, 122.

The stops used to limit the axial travel of the shaft 62 in FIG. 10 are also different than in FIGS. 2-4 and FIGS. 5-6. In particular, in FIG. 10, the shaft 62 includes a radial shoulder 274 formed thereon which can be circumferentially continuous, and formed on the shaft 62 within the housing 100 and projecting radially from the shaft 62. The shoulder 274 is designed to abut against a pair of washers 276 disposed within the housing 100 as shown in FIG. 10 or abut directly against the end cap 108 to define a maximum extended position of the shaft 62. In addition, the end of the shaft 62 is designed to abut against a surface 278 of the housing 100 defining the end of the housing passageway 106 to define a maximum retracted position of the shaft 62. Therefore, in this example, the shoulder 274 and the washers 276 (or the first end cap 108) together form the first stop, and the end of the shaft 62 and the surface 278 together form the second stop.

Figure 14:
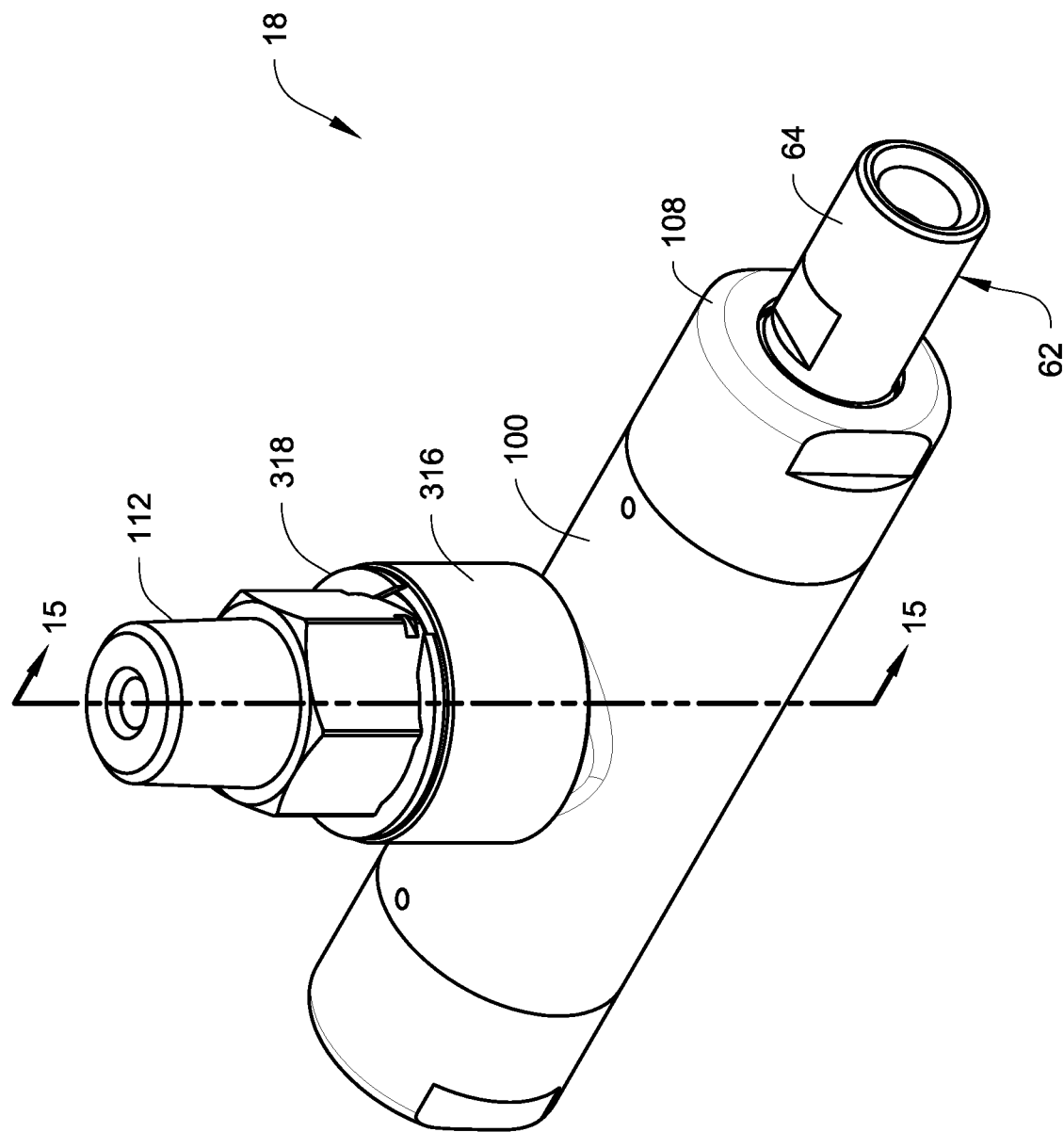
FIG. 14 is a perspective view of another embodiment of a quick connect fluid connector swivel.
Figure 15:
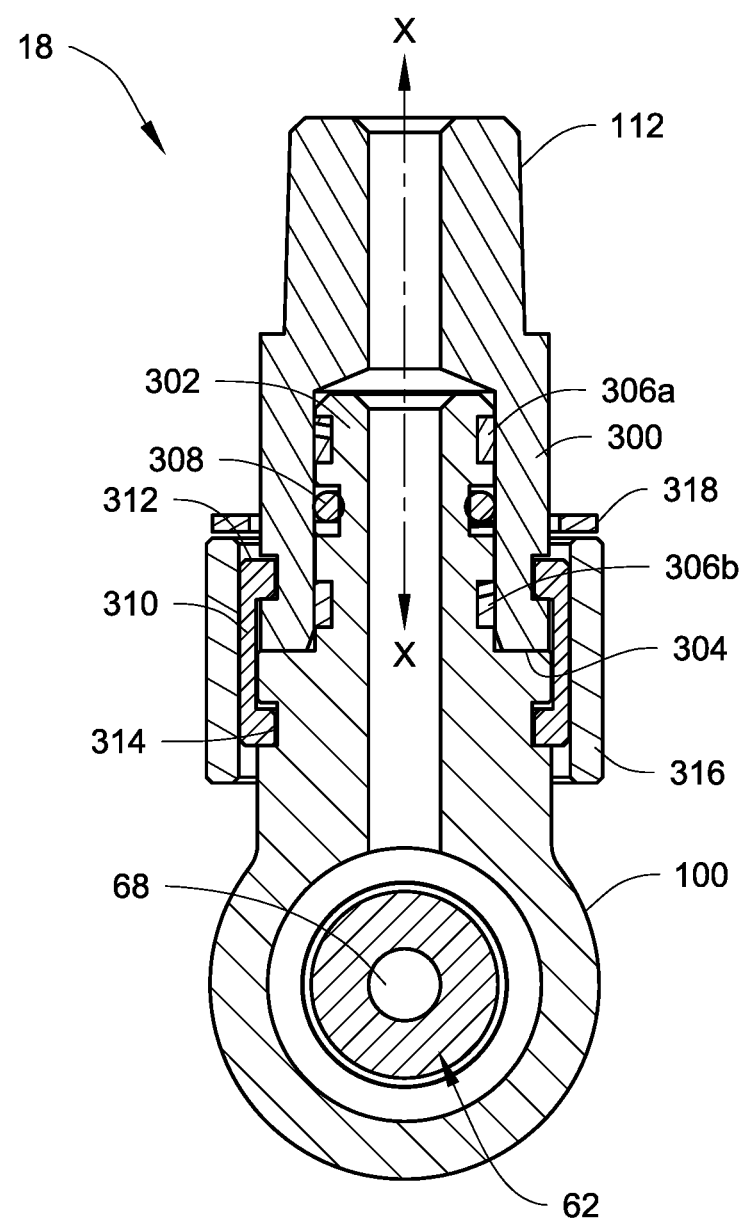
FIG. 15 is a cross-sectional view along line 15-15 in FIG. 14.

FIGS. 14 and 15 illustrate another embodiment of the quick connect fluid connector swivel 18. In this embodiment, the swivel 18 can have a construction like that in FIGS. 5-6 (or like in FIGS. 2-4, 9-10 and 13), and elements that are similar to elements in FIGS. 5-6 are referenced using the same reference numerals. In this embodiment of the swivel 18, the fluid port 112 is mounted so that the fluid port 112 and the remainder of the swivel 18 can swivel relative to one another about the axis X-X which may or may not be perpendicular to the longitudinal axis of the shaft 62. The relative swiveling between the fluid port 112 and the remainder of the swivel 18 can be in addition to the rotation of the shaft 62 about the shaft axis, and the longitudinal displacement of the shaft 62 relative to the housing 100 in a direction parallel to the shaft axis. However, the relative swiveling between the fluid port 112 and the remainder of the swivel 18 can be the only relative movement in the swivel 18, or it can be used with only one of the rotation of the shaft 62 or the longitudinal displacement of the shaft 62.

Referring to FIG. 15, an end of the fluid port 112 can be configured as a sleeve 300 that receives a protruding male portion 302 of the housing 100. The sleeve 300 includes an end thereof that rests on and is supported by a shoulder 304 formed on the male portion 302. Bushings 306a, 306b or other types of bearings can be provided between the male portion 302 and the interior of the sleeve 300, and one or more seals 308 can be provided to seal between the sleeve 300 and the male portion 302. A clamp ring 310 fits at one end in a circumferential channel 312 formed in the sleeve 300 and at a second end in a circumferential channel 314 formed in the housing 100 to retain the fluid port 112 in position on the housing 100. In addition, a collar 316 surrounds the clamp ring 310 and a snap ring 318 fits around the sleeve 300 to secure the collar 316 in place.

With the described construction, the fluid port 112 and the remainder of the swivel 18 can swivel relative to one another about the axis X-X. In use of the swivel 18 in FIGS. 14-15, the fluid port 112 can be secured to the fluid port 20 of the manifold 12 (see FIG. 1) and the swivel 18 is connected to the quick connect fluid connector as described above. Because of the swivel mounting between the fluid port 112 and the rest of the swivel 18, the swivel 18 and the quick connect fluid connector connected thereof are able to rotate about the axis X-X, allowing the swivel 18 and/or the quick connect fluid connector to be rotated out of the way.

Figure 16:
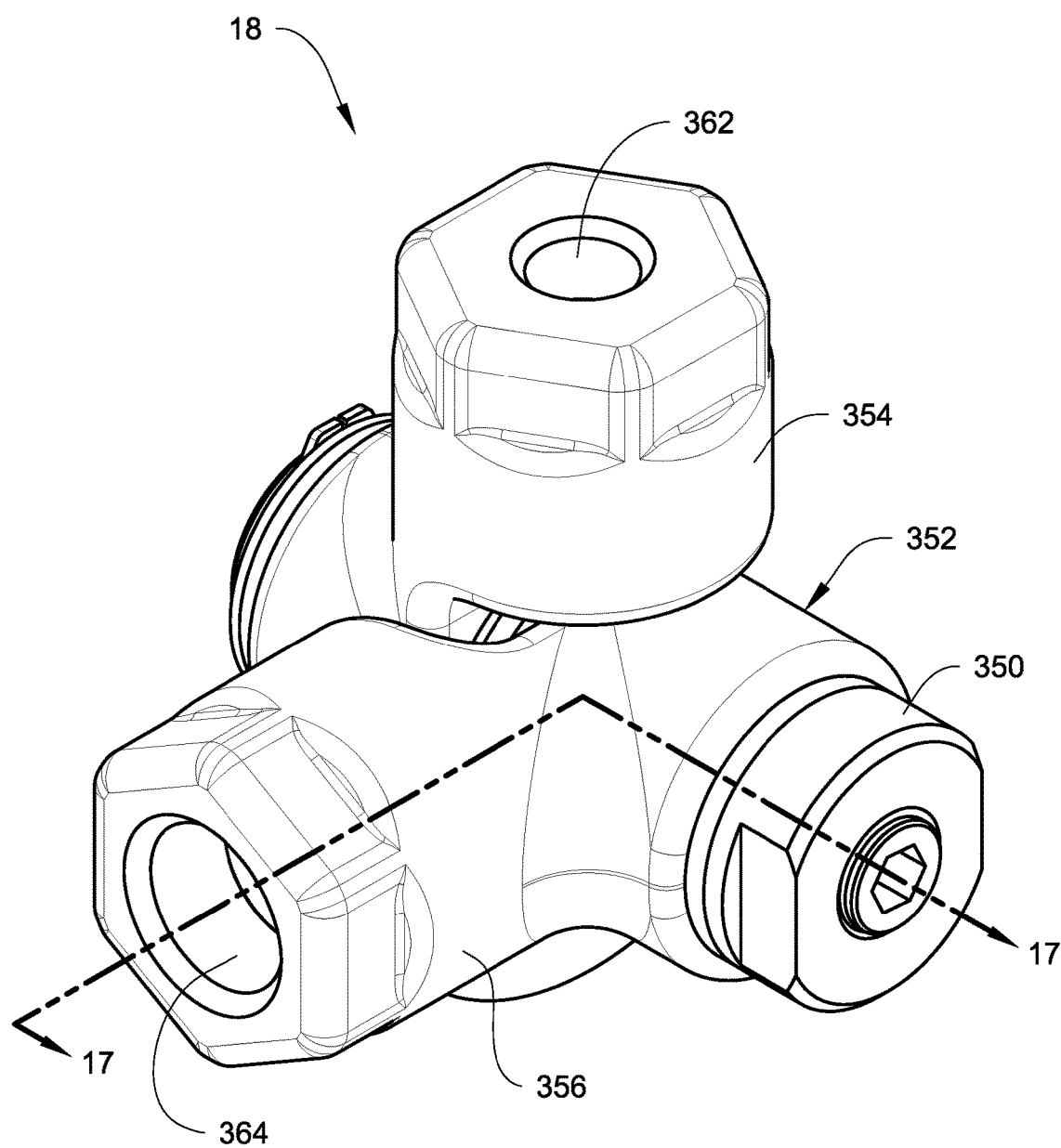
FIG. 16 is a perspective view of another embodiment of a quick connect fluid connector swivel.
Figure 17:
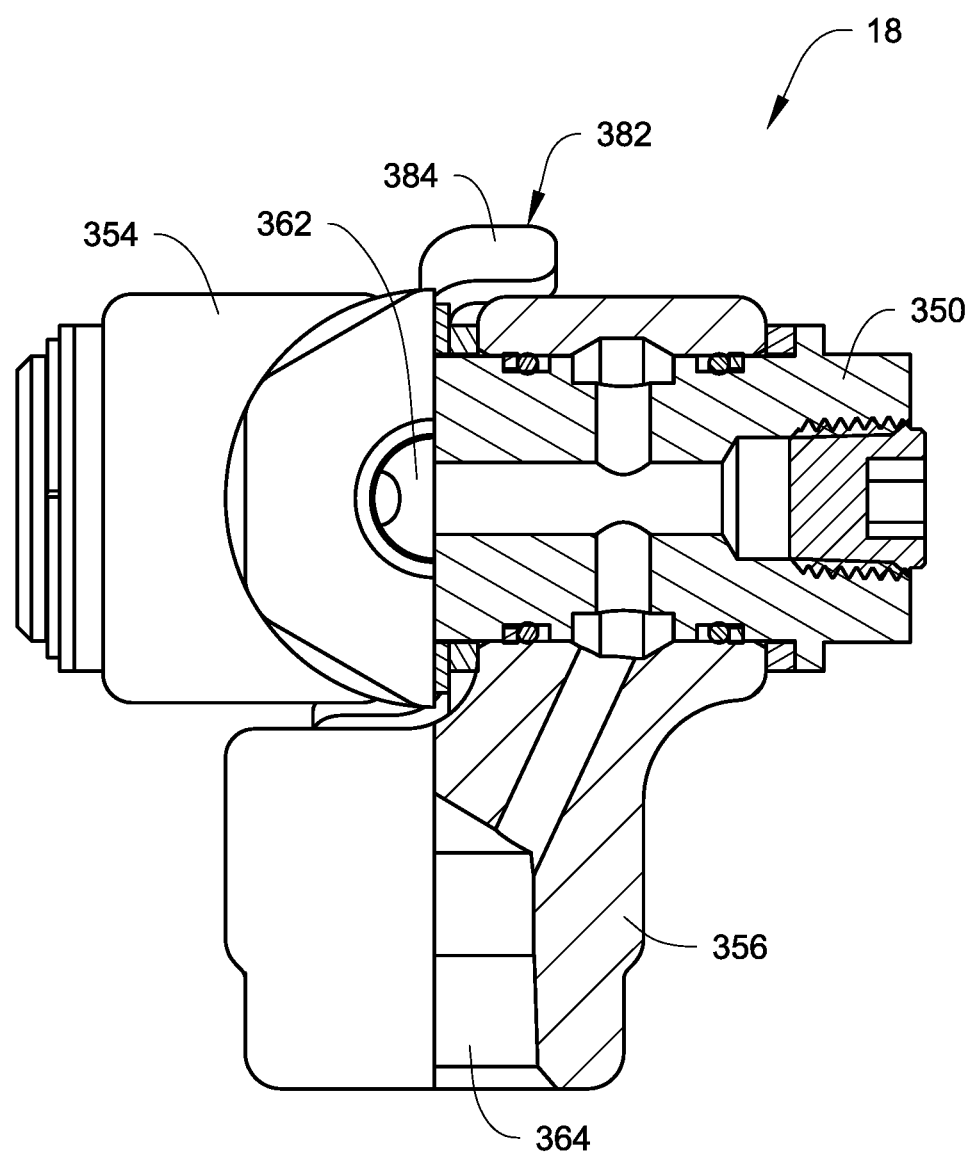
FIG. 17 is a partial sectional view taken along line 17-17 in FIG. 16.
Figure 18:
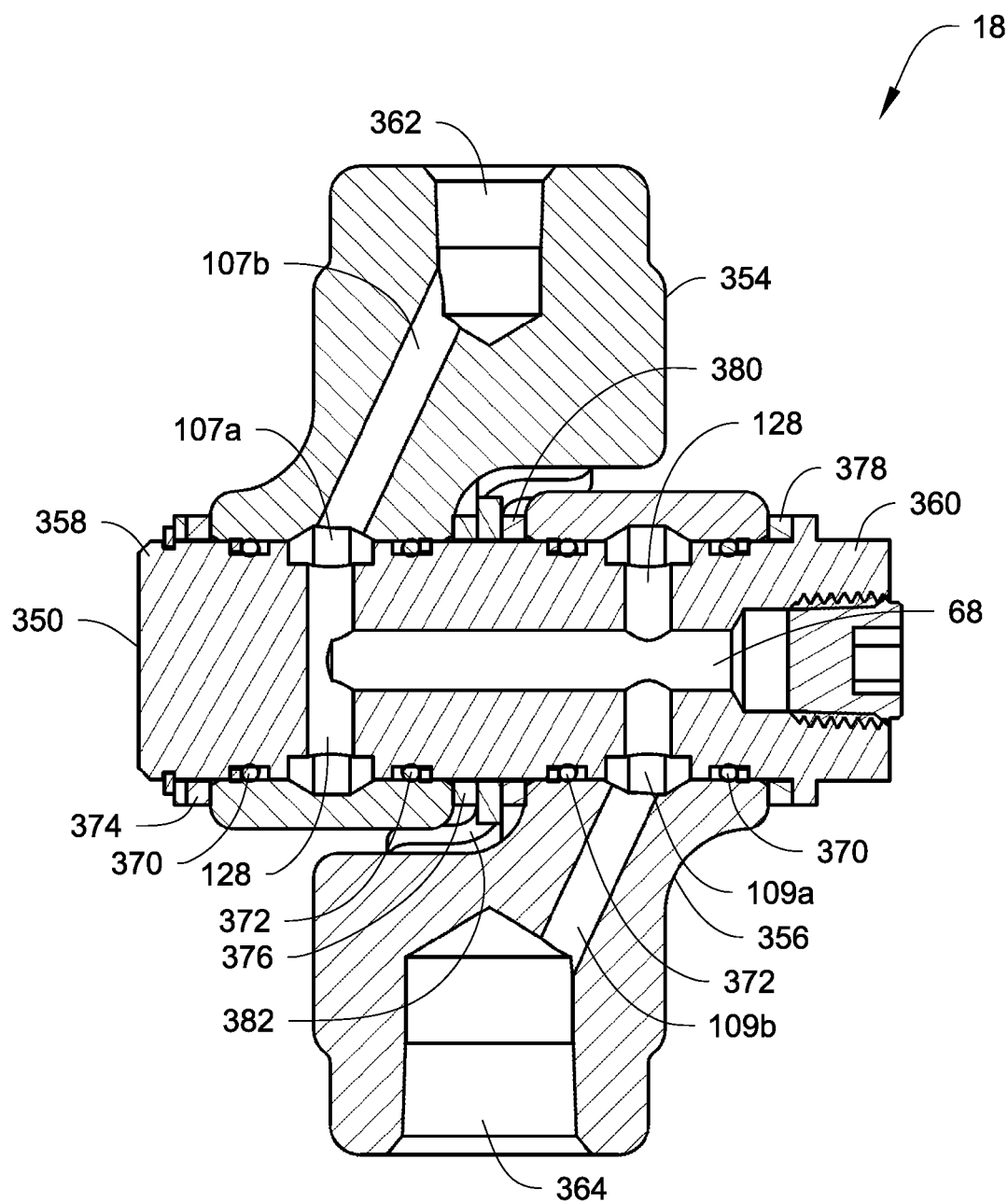
FIG. 18 is a cross-sectional view of the quick connect fluid connector swivel of FIG. 16 with the inlet and outlet ports rotated ninety degrees.

FIGS. 16-18 illustrate another embodiment of the quick connect fluid connector swivel 18. In this embodiment, the swivel 18 is configured as a "knuckle" that provides relative swiveling or rotation but does not include relative longitudinal displacement. The "knuckle" can provide 90 to 180 degree range of swiveling motion. However, a stop can be provided that limits the range of swiveling motion. In another embodiment, the "knuckle" can provide 360 degrees of swiveling motion if the housing portions discussed below are reversed in position. In FIGS. 16-18, elements that are similar to elements in FIGS. 1-6, 9-10 and 13 are referenced using the same reference numerals.

Referring to FIGS. 16-18, the swivel 18 includes a shaft 350 and a housing 352 surrounding the shaft 350. The housing 352 includes two housing portions including a first housing portion 354 and a second housing portion 356 that are rotatable relative to one another about the shaft 350 and rotatable relative to the shaft 350. The shaft 350 includes a first end 358 and a second end 360. The shaft fluid passageway 68 includes a pair of the transverse portions 128. One of the transverse portions 128 is in fluid communication with a circumferential housing fluid passageway 107a formed in the first housing portion 354 that connects to a fluid passage 107b formed in the first housing portion 354 that extends to an internally threaded port 362. The other transverse portion 128 is in fluid communication with a circumferential housing passageway 109a formed in the second housing portion 356 that connects to a fluid passage 109b formed in the second housing portion 356 extends to an internally threaded port 364.

Seals 370, 372 are provided on each side of each transverse portion 128 to seal between the shaft 350 and the housing portions 354, 356. In addition, bushings 374, 376 or other types of bearings can be provided between the first housing portion 354 and the shaft 350 to permit relative rotation therebetween about the axis of the shaft 350, while bushings 378, 380 or other types of bearings can be provided between the second housing portion 356 and the shaft 350 to permit relative rotation therebetween about the axis of the shaft 350.

With this construction, the first and second housing portions 354, 356 are rotatable relative to one another, and are also rotatable relative to the 350 about the axis of the shaft. For example, FIGS. 16 and 17 depict the first housing portion 354 and the second housing portion 354 rotated to a position 90 degrees relative to each other whereby the port 362 is 90 degrees relative to the port 364. FIG. 18 shows the first housing portion 354 rotated 90 degrees from its position in FIGS. 16-17, so that the port 362 of the first housing portion 354 and the port 364 of the second housing portion 354 are diametrically opposite one another and extend in opposite directions. In some embodiments, an optional stop 382 with stops 384 (best seen in FIGS. 17-19) can be provided to limit the extent of rotation of the first housing portion 354 and the second housing portion 356.

In use of the swivel 18, the first housing portion 354 can be connected to the quick connect fluid connector 16 via the port 362, while the second housing portion 356 can be connected to the fluid manifold 12, for example to the fluid port 20 or to a fluid line (not shown), for example a rigid pipe or a flexible hose, extending from the manifold 12. As a result, in operation, the quick connect fluid connector 16 can be rotated downward from a first position where the fluid connector 16 is generally vertical (for example when the first housing portion 354 and the second housing portion 356 are oriented as in FIGS. 16-17) to an out of the way position, for example 90 degrees where the fluid connector 16 is generally horizontal (for example when the first housing portion 354 and the second housing portion 356 are oriented as in FIG. 18.

Figure 19:
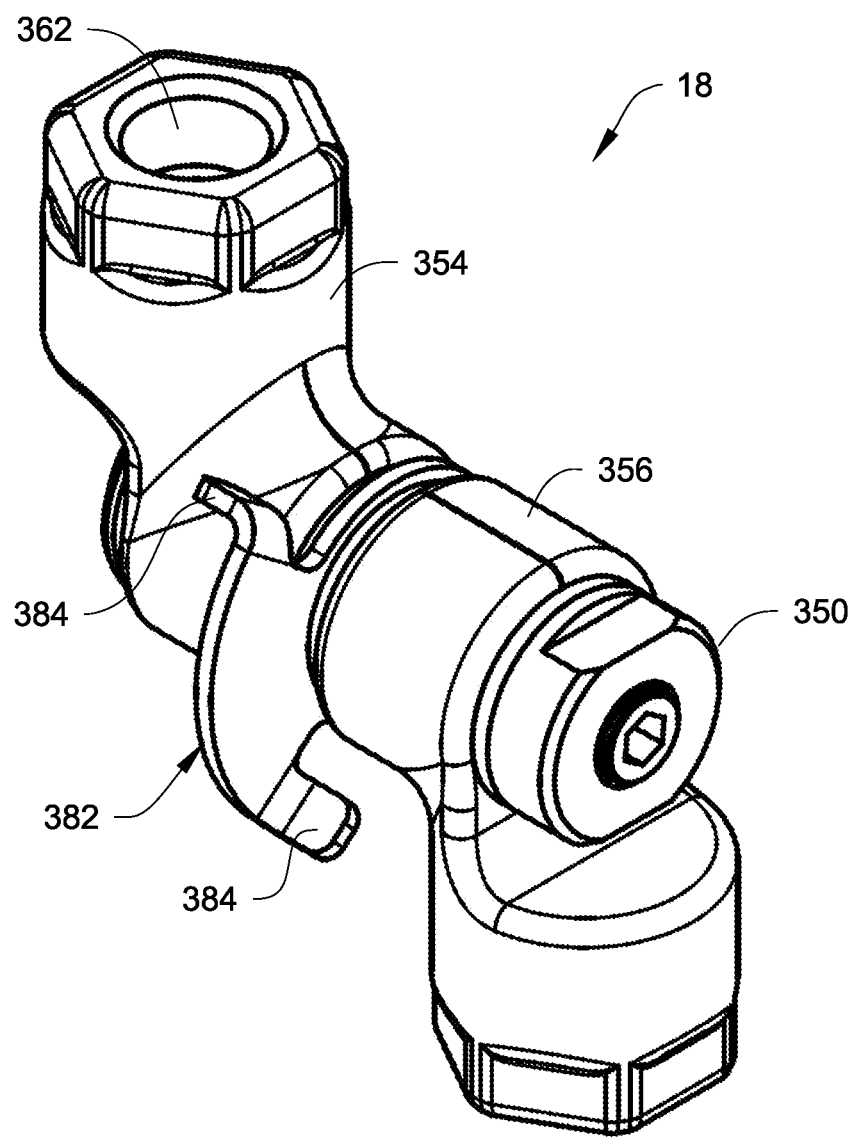
FIG. 19 illustrates the quick connect fluid connector swivel of FIGS. 16-18 with the housing portions reversed from FIG. 16.

FIG. 19 illustrates the "knuckle" design of FIGS. 16-18 with the two housing portions 354, 356 reversed in position from their position in FIGS. 16-18. This permits the housing portions 354, 356 to rotate 360 degrees because the stops 384 no longer interfere with rotation of the housing portions 354, 356.

Many additional configurations are possible. For example, two or more of the swivels 18 can be coupled together in order to provide relative rotation and/or longitudinal sliding in different directions. For example, the fluid port 112 of a second swivel 18 can be secured to the threads 150 of the shaft 62 of a first swivel 18. This would provide relative rotation and/or longitudinal sliding about axes that are generally perpendicular to one another.

The following additional embodiments are possible.

Embodiment 1

A quick connect fluid connector swivel that can include:

a housing having a housing first end, a housing second end, and a longitudinal axis extending from the housing first end to the housing second end;

a housing passageway formed in the housing along the longitudinal axis, the housing passageway extending through the housing first end;

a fluid port formed in the housing, the fluid port is in fluid communication with the housing passageway;

a shaft disposed in the housing passageway, the shaft having a shaft first end, a shaft second end, and a shaft axis that is coaxial to the longitudinal axis;

the shaft first end is connectable to a quick connect fluid connector;

the shaft is rotatable relative to the housing about the shaft axis, and the shaft is longitudinally displaceable relative to the housing in a direction parallel to the shaft axis;

a first stop that limits longitudinal displacement of the shaft relative to the housing in a first longitudinal direction and a second stop that limits longitudinal displacement of the shaft relative to the housing in a second longitudinal direction; and the shaft includes a shaft fluid passageway formed therein along the shaft axis and extending from the shaft first end in a direction toward the shaft second end, the shaft fluid passageway is in fluid communication with the fluid port, whereby the shaft fluid passageway is in fluid communication with a fluid passageway through the quick connect fluid connector when the shaft first end is connected to the quick connect fluid connector.

Embodiment 2

The quick connect fluid connector swivel of embodiment 1, where the fluid port is formed in a side of the housing between the housing first end and the housing second end; and further including:

a first seal that seals between the shaft and the housing, the first seal is located between the fluid port and the housing first end;

a second seal that seals between the shaft and the housing, the second seal is located between the fluid port and the housing second end; and the shaft fluid passageway of the shaft includes a transverse portion that exits through the shaft between the first seal and the second seal thereby creating a pressure balance zone between the first seal and the second seal.

Embodiment 3

The quick connect fluid connector swivel of embodiment 1 or 2, where the shaft second end includes a crumple zone.

Embodiment 4

The quick connect fluid connector swivel of any one of embodiments 1 to 3, where the housing first end includes a first removable cap threaded thereon, and the housing second end includes a second removable cap threaded thereon; and the shaft first end extends beyond the first removable cap.

Embodiment 5

The quick connect fluid connector swivel of any one of embodiments 1 to 4, further including a leak indicator on the housing, the leak indicator includes a leak indicator passageway that intersects the housing passageway at a location between the first seal and the housing first end or between the second seal and the housing second end.

Embodiment 6

A combination that includes the quick connect fluid connector swivel of any one of embodiments 1 to 5, and a quick connect fluid connector connected to the shaft first end, the quick connect fluid connector includes a fluid passageway that is in fluid communication with the shaft fluid passageway.

Embodiment 7

The combination of embodiment 6, where the shaft first end and the quick connect fluid connector are integrally connected, or the shaft first end and the quick connect fluid connector are detachably mechanically connected to one another.

Embodiment 8

A combination that includes:

a quick connect fluid connector that is detachably mechanically connectable to a fluid system to process a fluid into or from the fluid system through the quick connect fluid connector;

a quick connect fluid connector swivel connected to the quick connect fluid connector;

the quick connect fluid connector includes:

a connector housing with a housing fluid passageway through which the fluid can flow;

a connection mechanism that is actuatable between a connected position where the quick connect fluid connector is mechanically connected to the fluid system and permits fluid to flow into or from the fluid system through the housing fluid passageway and a disconnected position where the quick connect fluid connector is not mechanically connected to the fluid system;

the quick connect fluid connector swivel includes:

a swivel housing;

a shaft extending from the swivel housing and connected to the quick connect fluid connector, the shaft includes a shaft fluid passageway that is in fluid communication with the housing fluid passageway; and the shaft is rotatable relative to the swivel housing about the shaft axis, and the shaft is longitudinally displaceable relative to the swivel housing in a direction parallel to the shaft axis, whereby the connector housing can rotate relative to the swivel housing and the connector housing can move longitudinally relative to the swivel housing.

Embodiment 9

The combination of embodiment 8, where the connection mechanism includes a piston, a spring engaged with the piston and biasing the piston toward the connected position, and the piston is pneumatically actuatable toward the disconnected position.

Embodiment 10

A system that can include:

a fluid manifold having a plurality of fluid ports;

a plurality of quick connect fluid connector swivels, each one of the quick connect fluid connector swivels is connected to a corresponding one of the fluid ports;

a plurality of quick connect fluid connectors, each one of the quick connect fluid connectors is connected to a corresponding one of the quick connect fluid connector swivels, and each one of the quick connect fluid connectors is detachably mechanically connectable to a fluid system to process a fluid into or from the fluid system through the quick connect fluid connector;

where each one of the quick connect fluid connector swivels is configured to permit rotational and longitudinal movement of the corresponding quick connect fluid connector relative to the corresponding fluid port of the fluid manifold, and wherein each quick connect fluid connector is fluidly connected to the fluid manifold without using a fluid hose anywhere in a fluid path between the quick connect fluid connector and the fluid port.

Embodiment 11

A method of facilitating processing of a fluid into or from a fluid cylinder, including:

connecting a quick connect fluid connector to a fluid port of a fluid manifold using a quick connect fluid connector swivel that is configured to permit rotational and longitudinal movement of the quick connect fluid connector relative to the fluid port and without using a fluid hose anywhere in a fluid path between the quick connect fluid connector and the fluid port;

connecting the quick connect fluid connector to the fluid cylinder; and processing fluid into or from the fluid cylinder through the quick connect fluid connector and the quick connect fluid connector swivel.

Embodiment 12

A method of connecting a quick connect fluid connector to a valve assembly of a fluid cylinder, the quick connect fluid connector having a recess that is configured to receive the valve assembly, the method including:
applying pneumatic pressure to retract a piston of the quick connect fluid connector in a direction away from the recess;
thereafter installing the valve assembly into the recess between a clip located on one side of the recess and a pin plate located on an opposite side of the recess, the clip is biased in a direction toward the valve assembly to thereby temporarily hold the valve assembly in the recess between the clip and the pin plate;
thereafter releasing the pneumatic pressure so that a biasing force acting on the piston biases the piston toward the valve assembly so that the piston seals with the valve assembly and the valve assembly is secured in position between the clip and the pin plate.

Embodiment 13

The method of embodiment 12, including reapplying pneumatic pressure to retract the piston, and thereafter removing the valve assembly from the recess.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A quick connect fluid connector swivel, comprising:
a first portion that is mechanically and fluidly connectable to a first fluid system;
a second portion that is mechanically and fluidly connectable to a quick connect fluid connector that is connectable to a second fluid system;
a fluid passageway that fluidly connects the first portion and the second portion to permit fluid communication between the first fluid system and the second fluid system via the quick connect fluid connector; and
the first portion and the second portion are rotatable relative to one another about a longitudinal axis;
the first portion is a housing with a port that is mechanically and fluidly connectable to the first fluid system;
the second portion is a shaft that is disposed within the housing, an end of the shaft is mechanically connectable to the quick connect fluid connector, and the shaft includes at least a portion of the fluid passageway;
the housing has a housing first end, a housing second end, and the longitudinal axis extends from the housing first end to the housing second end;
a housing passageway formed in the housing along the longitudinal axis, the housing passageway extending through the housing first end;
the port is in fluid communication with the housing passageway;
the shaft is disposed in the housing passageway, the shaft having a shaft first end, a shaft second end, and a shaft axis that is coaxial to the longitudinal axis;
the shaft first end is connectable to the quick connect fluid connector;
the shaft is rotatable relative to the housing about the shaft axis, and the shaft is longitudinally displaceable relative to the housing in a direction parallel to the shaft axis;
a first stop that limits longitudinal displacement of the shaft relative to the housing in a first longitudinal direction and a second stop that limits longitudinal displacement of the shaft relative to the housing in a second longitudinal direction;
the fluid passageway includes a shaft fluid passageway formed in the shaft along the shaft axis and extending from the shaft first end in a direction toward the shaft second end, the shaft fluid passageway is in fluid communication with the port;
wherein the housing first end includes a first removable cap threaded thereon, and the housing second end includes a second removable cap threaded thereon; and
the shaft first end extends beyond the first removable cap.

2. A quick connect fluid connector swivel, comprising:
a first portion that is mechanically and fluidly connectable to a first fluid system;
a second portion that is mechanically and fluidly connectable to a quick connect fluid connector that is connectable to a second fluid system;
a fluid passageway that fluidly connects the first portion and the second portion to permit fluid communication between the first fluid system and the second fluid system via the quick connect fluid connector;
bearings engaged with and between the first portion and the second portion wherein the first portion and the second portion are rotatable relative to one another about a longitudinal axis and the first portion and the second portion are longitudinally displaceable relative to one another along the longitudinal axis, and the bearings are longitudinally spaced from one another;
the first portion is a housing with a port that is mechanically and fluidly connectable to the first fluid system;
the second portion is a shaft that is disposed within the housing, an end of the shaft is mechanically connectable to the quick connect fluid connector, and the shaft includes at least a portion of the fluid passageway;
the housing has a housing first end, a housing second end, and the longitudinal axis extends from the housing first end to the housing second end;
a housing passageway formed in the housing along the longitudinal axis, the housing passageway extending through the housing first end;
the port is in fluid communication with the housing passageway;
the shaft is disposed in the housing passageway, the shaft having a shaft first end, a shaft second end, and a shaft axis that is coaxial to the longitudinal axis;
the shaft first end is connectable to the quick connect fluid connector;
the shaft is rotatable relative to the housing about the shaft axis, and the shaft is longitudinally displaceable relative to the housing in a direction parallel to the shaft axis;
a first stop that limits longitudinal displacement of the shaft relative to the housing in a first longitudinal direction and a second stop that limits longitudinal displacement of the shaft relative to the housing in a second longitudinal direction;
the fluid passageway includes a shaft fluid passageway formed in the shaft along the shaft axis and extending from the shaft first end in a direction toward the shaft second end, the shaft fluid passageway is in fluid communication with the port;

the port is formed in a side of the housing between the housing first end and the housing second end;

a first seal that seals between the shaft and the housing, the first seal is located between the port and the housing first end;

a second seal that seals between the shaft and the housing, the second seal is located between the port and the housing second end;

the shaft fluid passageway of the shaft includes a transverse portion that exits through the shaft between the first seal and the second seal thereby creating a pressure balance zone between the first seal and the second seal; and a leak indicator on the housing, the leak indicator includes a leak indicator passageway that intersects the housing passageway at a location between the first seal and the housing first end or between the second seal and the housing second end.

3. A combination comprising:
a quick connect fluid connector that is detachably mechanically connectable to a fluid system to process a fluid into or from the fluid system through the quick connect fluid connector; and
a quick connect fluid connector swivel connected to the quick connect fluid connector;
wherein the quick connect fluid connector includes:
   a connector housing with a housing fluid passageway through which the fluid can flow;
   a connection mechanism that is actuatable between a connected position where the quick connect fluid connector is mechanically connected to the fluid system and permits fluid to flow into or from the fluid system through the housing fluid passageway and a disconnected position where the quick connect fluid connector is not mechanically connected to the fluid system;
the quick connect fluid connector swivel includes:
   a first portion that is mechanically and fluidly connectable to an additional fluid system;
   a second portion that is mechanically and fluidly connected to the quick connect fluid connector;
   a fluid passageway that fluidly connects the first portion and the second portion to permit fluid communication between the fluid system and the additional fluid system via the quick connect fluid connector and the quick connect fluid connector swivel; and
   bearings engaged with and between the first portion and the second portion to permit the first portion and the second portion to rotate relative to one another about a longitudinal axis, and the bearings are longitudinally spaced from one another.

4. The combination of claim 3, wherein the first portion and the second portion are longitudinally displaceable relative to one another along the longitudinal axis.

5. The combination of claim 3, wherein the first portion is a first housing portion, and the second portion is a second housing portion;
   the first housing portion and the second housing portion are disposed around a shaft that includes at least a portion of the fluid passageway, the longitudinal axis extends through the shaft; and
   the first housing portion and the second housing portion are each rotatable relative to the shaft.

6. A combination comprising:
a quick connect fluid connector that is detachably mechanically connectable to a fluid system to process a fluid into or from the fluid system through the quick connect fluid connector; and
a quick connect fluid connector swivel connected to the quick connect fluid connector;
wherein the quick connect fluid connector includes:
   a connector housing with a housing fluid passageway through which the fluid can flow;
   a connection mechanism that is actuatable between a connected position where the quick connect fluid connector is mechanically connected to the fluid system and permits fluid to flow into or from the fluid system through the housing fluid passageway and a disconnected position where the quick connect fluid connector is not mechanically connected to the fluid system;
the quick connect fluid connector swivel includes:
   a first portion that is mechanically and fluidly connectable to an additional fluid system;
   a second portion that is mechanically and fluidly connected to the quick connect fluid connector;
   a fluid passageway that fluidly connects the first portion and the second portion to permit fluid communication between the fluid system and the additional fluid system via the quick connect fluid connector and the quick connect fluid connector swivel; and
   the first portion and the second portion are rotatable relative to one another about a longitudinal axis;
wherein the first portion is a housing with a port that is mechanically and fluidly connectable to the additional fluid system;
the second portion is a shaft that is disposed within the housing, an end of the shaft is mechanically connected to the quick connect fluid connector, and the shaft includes at least a portion of the fluid passageway.

7. The combination of claim 6, wherein the port is rotatable relative to the housing.

8. The combination of claim 7, wherein the port is rotatable relative to the housing about an axis that is perpendicular to the longitudinal axis.

* * * * *